(12) United States Patent
Tanahashi et al.

(10) Patent No.: US 7,835,237 B2
(45) Date of Patent: Nov. 16, 2010

(54) OPTICAL PICKUP DEVICE AND INFORMATION RECORDING/REPRODUCING APPARATUS

(75) Inventors: Yasuo Tanahashi, Tsurugashima (JP); Takuma Yanagisawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 482 days.

(21) Appl. No.: 11/995,746

(22) PCT Filed: Jul. 13, 2006

(86) PCT No.: PCT/JP2006/313958

§ 371 (c)(1),
(2), (4) Date: Jan. 15, 2008

(87) PCT Pub. No.: WO2007/010818

PCT Pub. Date: Jan. 25, 2007

(65) Prior Publication Data

US 2009/0103417 A1    Apr. 23, 2009

(30) Foreign Application Priority Data

Jul. 19, 2005    (JP) .............................. 2005-209105

(51) Int. Cl.
*G11B 7/00*    (2006.01)
(52) U.S. Cl. ................................. 369/44.37; 369/53.28

(58) Field of Classification Search ........................ None
See application file for complete search history.

(56) References Cited

U.S. PATENT DOCUMENTS

| | | | | | |
|---|---|---|---|---|---|
| 6,088,310 | A | * | 7/2000 | Yanagawa | ................. 369/44.38 |
| 7,116,612 | B2 | * | 10/2006 | Ogasawara et al. | ...... 369/44.37 |
| 7,266,057 | B2 | * | 9/2007 | Buchler | ................... 369/44.29 |
| 2004/0246834 | A1 | * | 12/2004 | Seong | ...................... 369/44.37 |

FOREIGN PATENT DOCUMENTS

| | | |
|---|---|---|
| JP | 2001-297461 | 10/2001 |
| JP | 2004-5859 | 1/2004 |

* cited by examiner

*Primary Examiner*—Lixi Chow
(74) *Attorney, Agent, or Firm*—Drinker Biddle & Reath LLP

(57) ABSTRACT

There are obtainable reliable and proper tracking correction and CTC even when fluctuations occur in an irradiation position of a sub-beam in a track at the time of performing tracking correction and CTC using three beams. Five beams (a main beam, sub-beams inA and inB, and sub-beams outA and outB) are generated. Reflection beams of the five beams are received, and a differential push pull signal DPPin corresponding to the sub-beams "in" as ± first-order beams and a differential push pull signal DPPout corresponding to the sub-beams "out" as ± second-order beams are generated. By assigning weights to the differential push pull signals DPPin and DPPout and computing the sum of the weighted signals, a tracking error signal Ste having an amplitude value which can perform tracking correction is generated.

9 Claims, 16 Drawing Sheets

FIG. 7

| r | rmin~r1 | r1~r2 | r2~r3 | r3~r4 | r4~rmax |
|---|---|---|---|---|---|
| kin | 0 | (r−r1)/(r2−r1) | 1 | (r4−r)/(r4−r3) | 0 |
| kout | 1 | (r2−r)/(r2−r1) | 0 | (r−r3)/(r4−r3) | 1 |

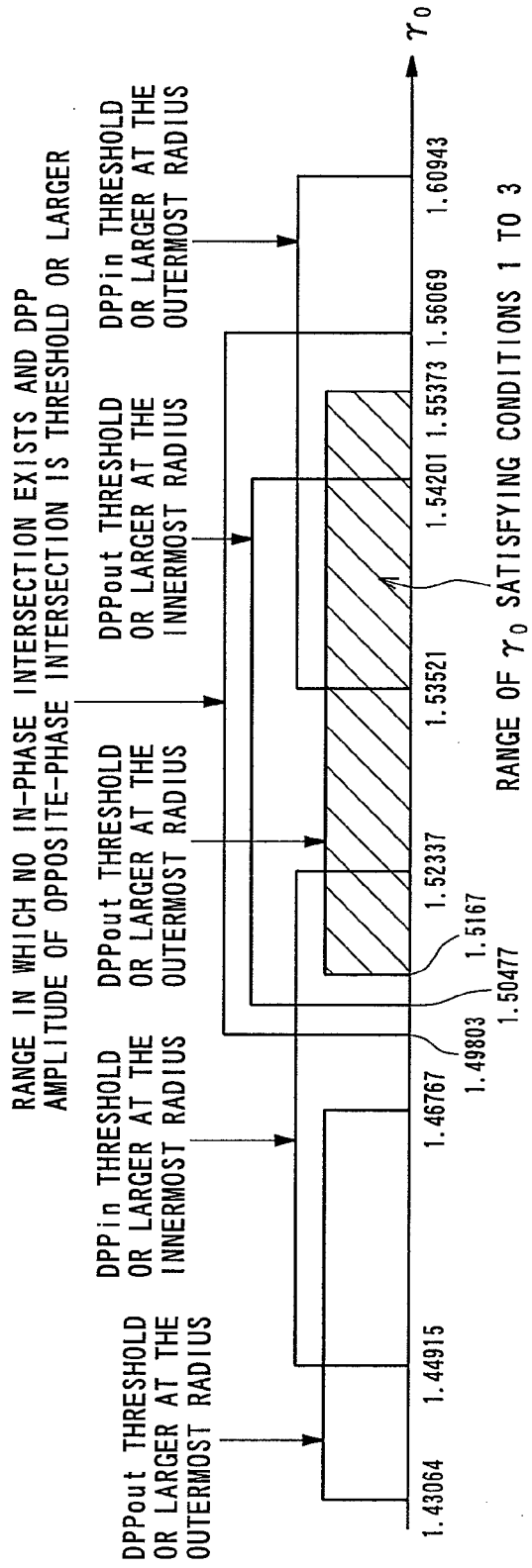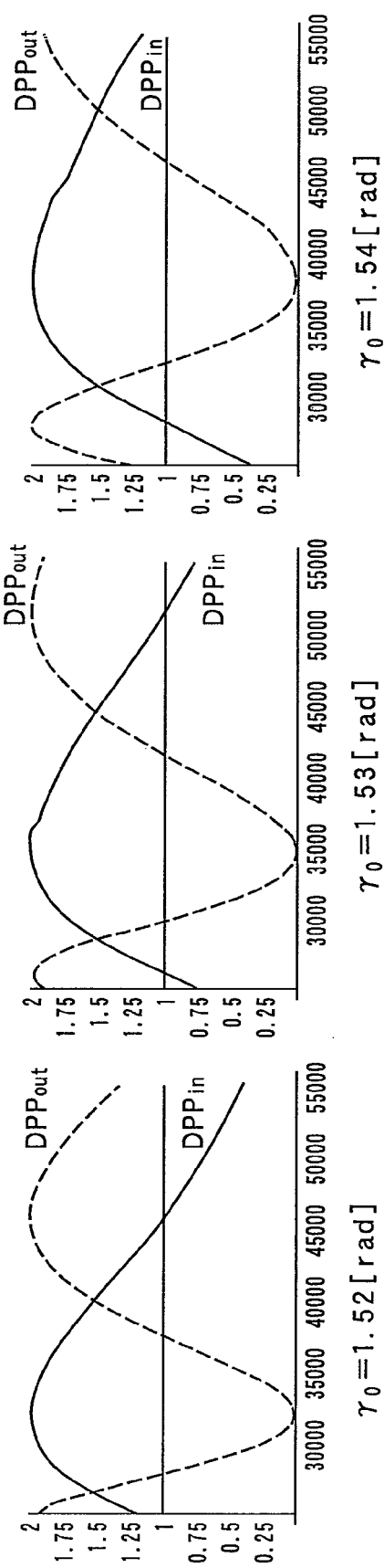

OPTICAL PICKUP DEVICE AND INFORMATION RECORDING/REPRODUCING APPARATUS

TECHNICAL FIELD

The present invention relates to an optical pickup device used for recording/reproducing information to/from an optical recording medium such as an optical disk, a method of controlling the same, and an information recording/reproducing apparatus using the optical pickup device.

BACKGROUND ART

Conventionally, various methods for performing tracking correction and crosstalk cancellation (hereinbelow, called "CTC") are proposed in the field of an information recording/reproducing apparatus for an optical disc such as a CD (Compact Disc) and a DVD (Digital Versatile Disc). At present, a method of converting light emitted from a light source to three beams of a main beam (zeroth-order beam) and sub beams (± first-order beams) and performing tracking correction or CTC using the main beam and the sub beams is generally employed (for example, a differential push pull (DPP) method).

In the tracking correction method and the CTC method using the three beams, positions to be irradiated with the three beams are determined in advance in a track formed on the surface of a disk. When the positional relations are lost, the tracking correction or CTC cannot be performed properly. For example, in the DPP method, the relation that the phase of a push pull signal of the main beam and that of a push pull signal of the sub-beam are opposite to each other has to be maintained. It is consequently necessary to emit the sub-beams to positions shifted at a half track pitch (that is, on a land track) in the track normal direction. When the relation of the positions is lost, an accurate tracking error signal cannot be obtained.

On the other hand, the track pitch of an optical disk varies according to recording formats at present. In a so-called compatible recorder (an apparatus for recording/reproducing data to/from optical disks of different recording formats), various methods for satisfying the positional relations have been proposed in accordance with the kinds of optical disks to be recorded/reproduced. For example, Patent Document 1 discloses a method of converting a light beam emitted from a light source to five beams by a diffractive grating that generates not only a zeroth-order beam and ± first-order beams but also ± second-order beams and switching the light beam used for tracking correction in accordance with the kind of an optical disk to/from which data is recorded/reproduced.

Patent Document 1: Japanese Unexamined Patent Publication No. 2004-5859

DISCLOSURE OF THE INVENTION

Problems to be Solved by the Invention

In the case of actually manufacturing an information recording/reproducing apparatus, due to restrictions at the time of manufacture of an apparatus, a situation often occurs such that the radius axis of an optical disk and a shift axis of the center point of an objective lens (concretely, the axis of an objective lens which is shifted by a carriage servo or the like as a recording/reproduction position fluctuates) do not match. For example, in the case of assembling an optical pickup device having two objective lenses into an information recording apparatus, at the time of disposing one of the objective lenses on a slider shaft provided in parallel with the radius axis, the other objective lens is disposed shifted in the tangential direction of the optical disk from the slider shaft.

When the situation occurs that the radius axis of an optical disk and the shift axis of the center of the objective lens are deviated from each other for such a reason, as the position of recording/reproducing data changes as shown in FIG. 1, a phenomenon occurs such that the angle of a track tangential line changes in the objective lens dispose position. It causes a change in the sub-beam irradiation position on the track to the normal line direction of the track, and the degree of modulation of a tracking correction signal and a CTC signal decreases. As a result, the tracking correction and CTC cannot be performed.

However, in the invention disclosed in Patent Document 1, a sub-beam used for tracking correction is simply switched from the ± first-order beams to ± second-order beams in accordance with the kind of an optical disk. The invention does not have a function of dealing with a case such that the irradiation positions of the main beam and the sub-beams in a track change as the recording/reproduction positions of the main beam and the sub-beams change as the recording/reproduction position changes.

The present invention has been achieved in view of the above-described circumstances. An object of the invention is to provide an optical pickup device capable of realizing reliable and proper tracking correction and CTC even when fluctuations occur in an irradiation position of a sub-beam in a track at the time of performing tracking correction and CTC using three beams, a method of controlling the optical pickup device, and an information recording/reproducing apparatus.

Means for Achieving the Object

To achieve the object, according to an aspect of the present invention, there is provided an optical pickup device includes: light beam emitting means that emits five light beams; (i) a main beam, (ii) a first inner sub-beam, (iii) a second inner sub-beam, (iv) a first outer sub-beam, and (v) a second outer sub-beam; condensing means that condenses the five light beams to positions on an optical recording medium shifted by a predetermined amount in the circumferential direction of a wobble recording track from a radius axis passing through a center point of the recording track provided for the optical recording medium; light receiving means that receives reflection beams from the optical recording medium, of the five light beams and outputs light reception signals corresponding to the beams; generating means that (a) generates an inner signal for use in at least one of tracking correction and crosstalk cancellation from the light reception signals corresponding to the main beam, the first inner sub-beam, and the second inner sub-beam, and (b) generates an outer signal for use in at least one of tracking correction and crosstalk cancellation from the light reception signals corresponding to the main beam, the first outer sub-beam, and the second outer sub-beam; and sum signal generating means that multiplies each of the inner and outer signals with a coefficient and, after that, generates a sum signal of the inner and outer signals multiplied with the coefficients.

According to another aspect of the present invention, an information recording/reproducing apparatus includes: the optical pickup device according to any one of claims 1 to 8; driving means that drives the optical pickup device; control means that controls recording/reproduction of information to/from the optical recording medium by controlling the driving means; and output means that outputs a signal corresponding to a light reception result in the optical pickup device.

According to further another aspect of the present invention, a controlling method of an optical pickup device, the device including: light beam emitting means that emits five light beams; (i) a main beam, (ii) a first inner sub-beam, (iii) a second inner sub-beam, (iv) a first outer sub-beam, and (v) a second outer sub-beam; condensing means that condenses the five light beams to positions on an optical recording medium shifted by a predetermined amount in the circumferential direction of a wobble recording track from a radius axis passing through a center point of the recording track provided for the optical recording medium; and light receiving means that receives reflection beams from the optical recording medium, of the five light beams and outputs light reception signals corresponding to the beams, the method includes: a generating step of (a) generating an inner signal for use in at least one of tracking correction and crosstalk cancellation from the light reception signals corresponding to the main beam, the first inner sub-beam, and the second inner sub-beam, and (b) generating an outer signal for use in at least one of tracking correction and crosstalk cancellation from the light reception signals corresponding to the main beam, the first outer sub-beam, and the second outer sub-beam; and a sum signal generating step of multiplying each of the inner and outer signals with a coefficient and, after that, generating a sum signal of the inner and outer signals multiplied with the coefficients.

BRIEF DESCRIPTION OF DRAWINGS

FIG. 7 A diagram showing an example of data recorded in a coefficient setting table TBL in the embodiment.

FIG. 11A A diagram showing a concrete example of the range of the angle γ satisfying all of conditions 1, 2, and 3 in the first embodiment.

FIG. 11B A graph showing concrete characteristics of the differential push pull signals DPPin and DPPout in the ranges.

DESCRIPTION OF REFERENCE NUMERALS

RP: information recording/reproducing apparatus
S: servo unit
EG: error signal generator
WD: weight determining unit
AD: actuator driver
SP: signal processor
C: controller
D: drive circuit
PU: optical pickup device
P: playback unit

BEST MODE FOR CARRYING OUT THE INVENTION

[1] First Embodiment

Figure 2:
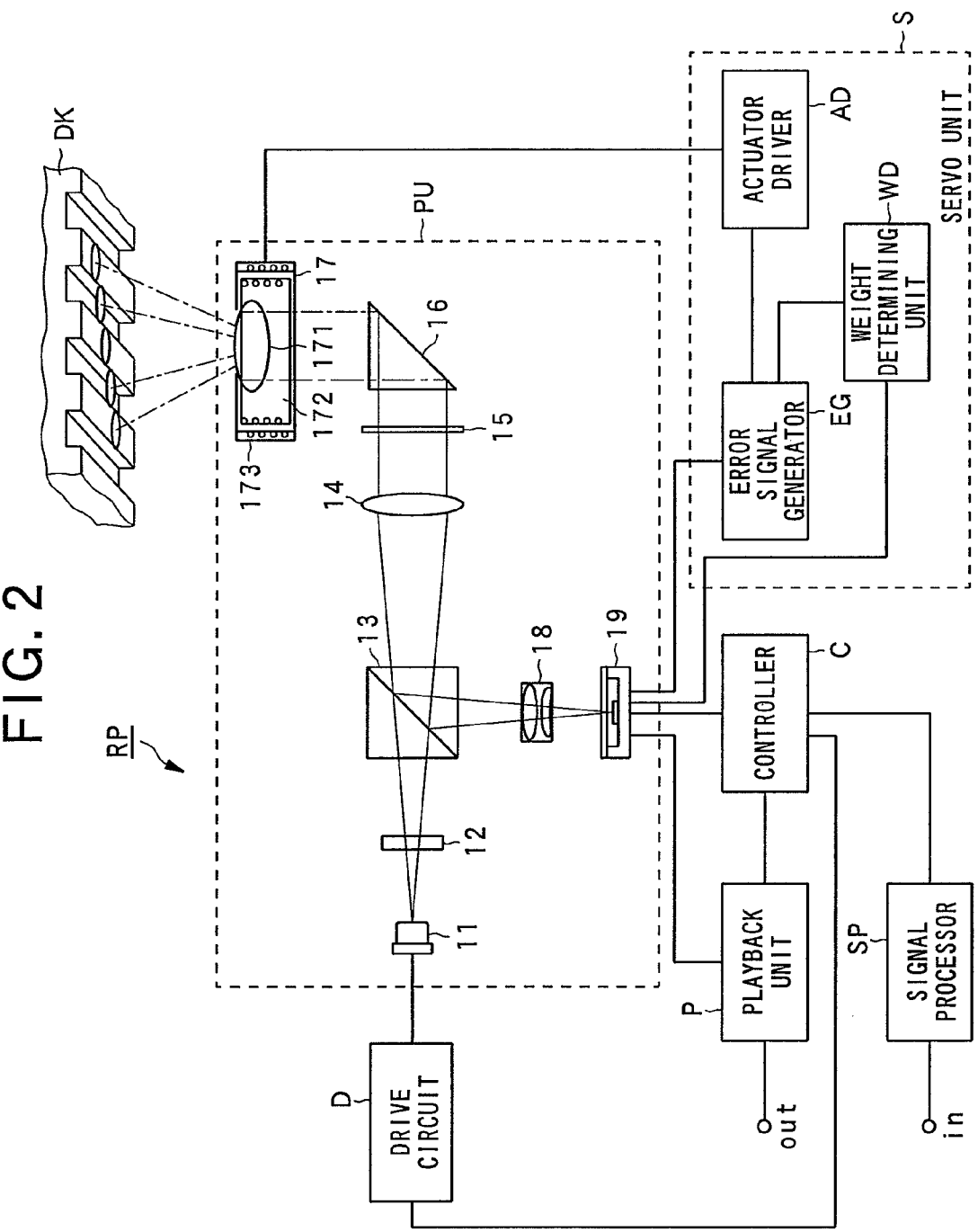
FIG. 2 A block diagram showing the configuration of an information recording/reproducing apparatus RP in a first embodiment.

[1.1] Configuration of First Embodiment (1) Schematic Configuration of Information Recording/Reproducing Apparatus RP Next, the configuration of an information recording/reproducing apparatus RP of a first embodiment of the present invention will be described with reference to FIG. 2. The information recording/reproducing apparatus RP is obtained by applying an optical pickup device of the present invention to a DVD recorder for recording/reproducing information to/from an optical disk DK conformed with a DVD format.

As shown in the diagram, the information recording/reproducing apparatus RP of the embodiment has, mainly, a signal processor SP, a controller C, a drive circuit D, an optical pickup device PU, a playback unit P, and a servo unit S. Although not shown, the optical pickup device PU of the information recording/reproducing apparatus RP is movably supported by a slider shaft in a state where it is fixed to a carriage. By moving the carriage along the slider shaft, a carriage servo is realized (refer to FIG. 1).

Figure 1:
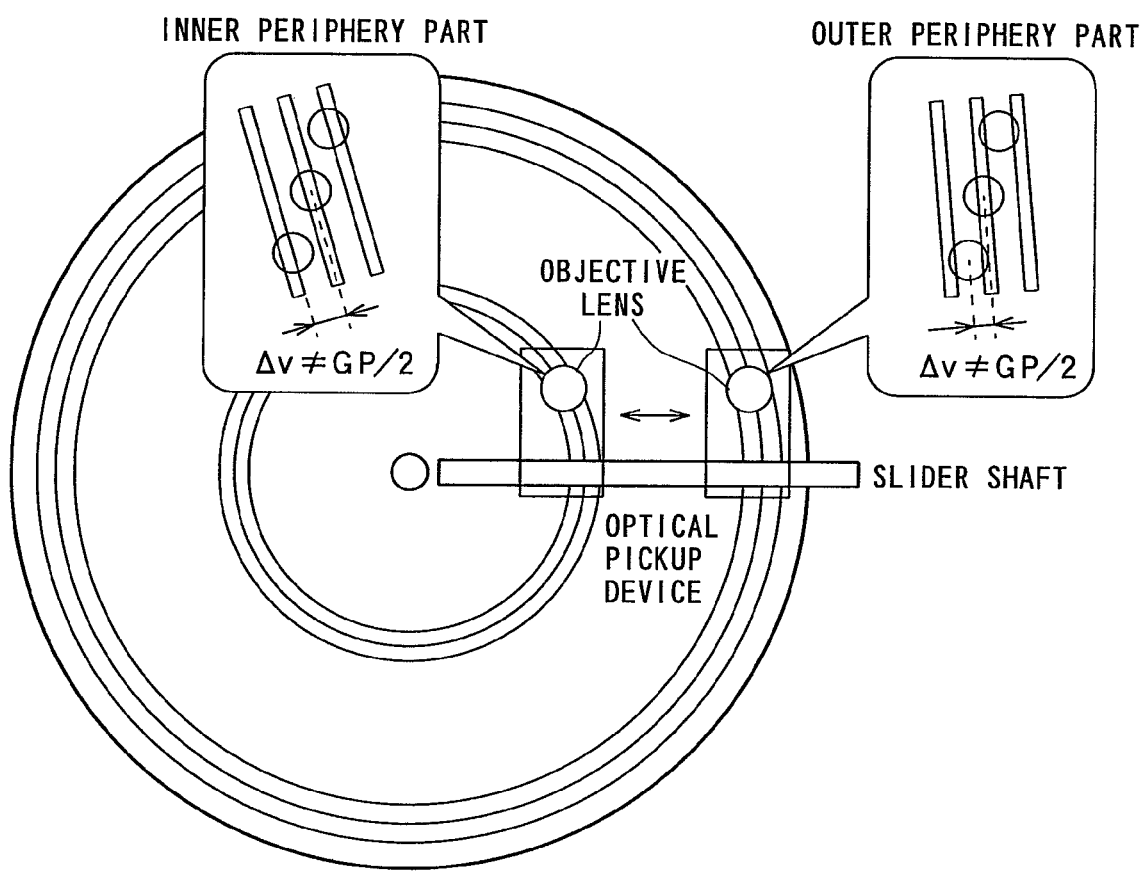
FIG. 1 A diagram for explaining a challenge of the invention.

In the information recording/reproducing apparatus RP, the center point of an objective lens 171 mounted on the optical pickup device PU is shifted from the radius axis of the optical disk DK in the tangential direction (the circumferential direction of the optical disk DK) (refer to FIG. 1). In the arrangement of the objective lens 171, a data recording/reproduction position fluctuates. When the optical pickup device PU moves along the slider shaft, the angle of the track tangential line changes in the arrangement position of the objective lens 171, and it is difficult to realize tracking correction using three beams (refer to FIG. 1).

The information recording/reproducing apparatus RP of the embodiment therefore employs the following method.

First, as a diffractive grating 12 mounted on the optical pickup device PU, a diffractive grating for emitting a zeroth-order beam, ± first-order beams and, in addition, ± second-order beams is used. A light beam emitted from a semiconductor laser 11 mounted on the optical pickup device PU is diffracted by the diffractive grating 12 to irradiate the surface of the optical disk DK with five beams (in the following, the zeroth beam will be called a "main beam", the +first-order beams will be called "sub-beams "in" (the beams are identified by adding characters A and B)", and the ± second-order beams will be called "sub-beams "out" (the beams are identified by adding characters A and B)").

Figure 3:
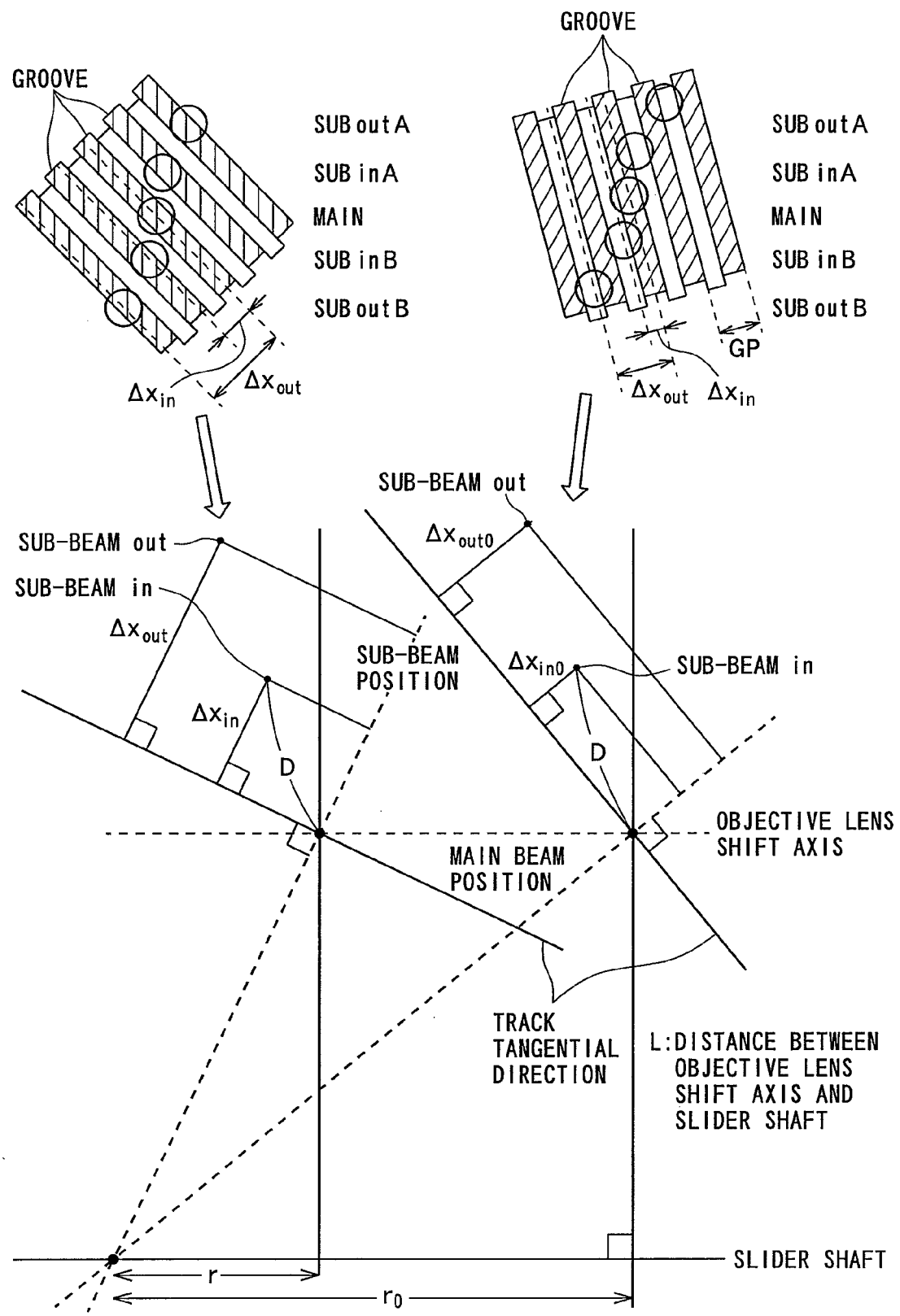
FIG. 3 A diagram showing the positional relations of light condensing spot positions of a main beam, sub-beams "in", and sub-beams "out" emitted to the surface of an optical disk DK, a slider shaft, and an objective lens 171 in the information recording/reproducing apparatus RP of the embodiment.
Figure 5:
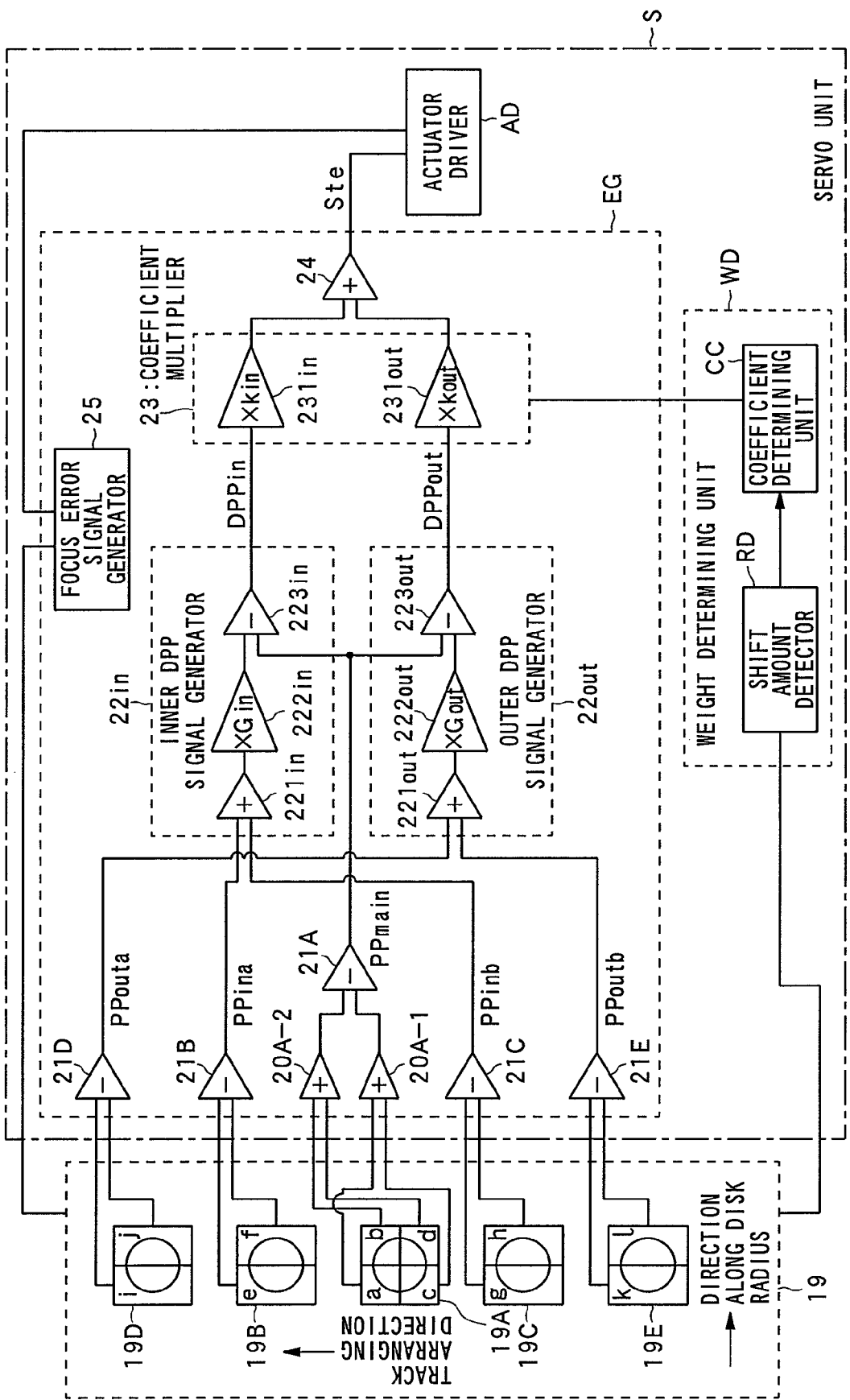
FIG. 5 A block diagram showing a concrete configuration of a servo unit S and an OEIC 19 in the embodiment.

It is assumed that light condensing spot positions of the main beam applied to the surface of the optical disk DK, the sub-beams "in" (applied to the inner side of the surface of the optical disk DK as shown in FIG. 3), and the sub-beams "out" (applied to the outer side) have the relations as shown in FIG. 3, and the case of receiving the beams by a half-split detector and generating push pull signals corresponding to the beams will be considered (vide FIG. 5, which will be described in detail later).

In this case, a push pull signal PPmain corresponding to the main beam is expressed as follows.

$$PPmain = \sin(2\pi x/GP) + \text{offset} \quad \text{[Equation 1]}$$

(where "GP" denotes a groove pitch, and "x" indicates a shift amount of a condensed spot in the track normal direction from an ideal position.) Push pull signals PPina, PPinb, PPouta, and PPoutb corresponding to sub-beams inA, inB, outA, and outB, respectively, are expressed as follows.

$$PPina = Ain\{\sin\{2\pi(x+\Delta xin)/GP\} + \text{offset}\} \quad \text{[Equation 2]}$$

$$PPinb = Ain\{\sin\{2\pi(x-\Delta xin)/GP\} + \text{offset}\} \quad \text{[Equation 3]}$$

$$PPouta = Aout\{\sin\{2\pi(x+\Delta xout)/GP\} + \text{offset}\} \quad \text{[Equation 4]}$$

$$PPoutb = Aout\{\sin\{2\pi(x-\Delta xout)/GP\} \text{offset}\} \quad \text{[Equation 5]}$$

"Δxin" and "Δxout" in Equations 2 and 3 indicate distances in the track normal direction from the center of the light condensing spot corresponding to the main beam to centers of the light condensing spots corresponding to the sub-beams "in" and "out" (refer to FIG. 3).

In the case of generating differential push pull signals DPPin and DPPout on the basis of the sub-beams "in" and "out", respectively, the signals are expressed by the following equations.

$$\begin{aligned} DPPin &= PPmain - Gin(PPina + PPinb) \quad \text{[Equation 6]} \\ &= \sin(2\pi x/GP) + \text{offset} - (1/2Ain) \\ &\quad [Ain\{\sin 2\pi(x+\Delta xin)/GP + \text{offset}\} + \\ &\quad Ain\{\sin 2\pi(x-\Delta xin)/GP + \text{offset}\}] \\ &= \{1 - \cos(2\pi\Delta xin/GP)\}\sin(2\pi x/GP) \end{aligned}$$

$$\begin{aligned} DPPout &= PPmain - Gout(PPouta + PPoutb) \quad \text{[Equation 7]} \\ &= \{1 - \cos(2\pi\Delta xout/GP)\}\sin(2\pi x/GP) \end{aligned}$$

(where "Gin" and "Gout" denote coefficients for correcting diffraction light amounts of the main beam and the sub-beams "in" and "out" in the diffractive grating 12).

On the other hand, in a case where the angle of the track tangential line in the arrangement position of the objective lens 171 changes due to fluctuations in a search position, as shown in FIG. 3, the values of Δxin and Δxout change accordingly. The parameters in Equations 6 and 7 fluctuate and, as a result, the amplitude of each of the differential push pull signals DPPin and DPPout changes.

Figure 4:
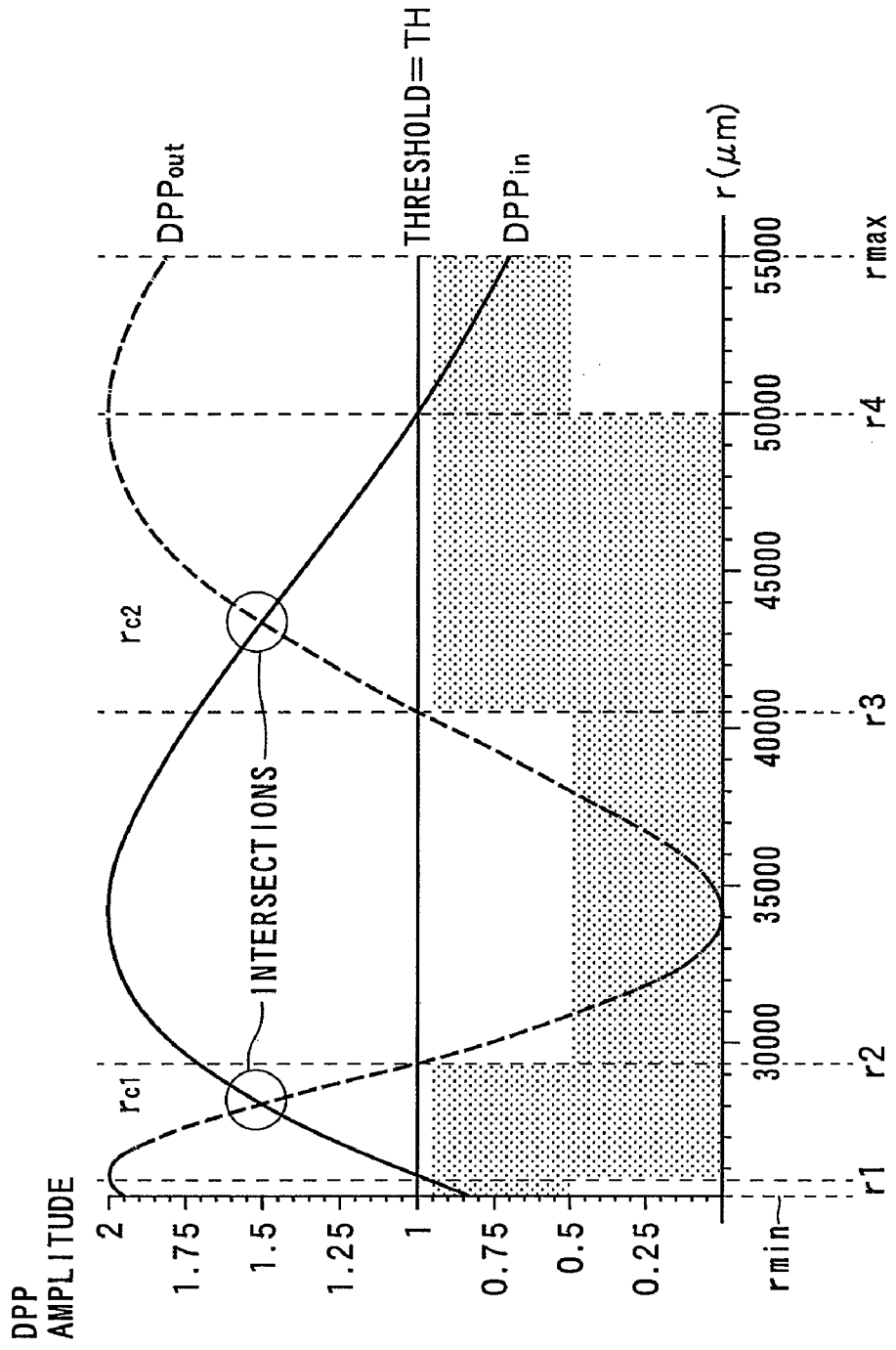
FIG. 4 A diagram showing a change state of the amplitude of each of differential push pull signals DPPin and DPPout under the environment that Δxin and Δxout are adjusted to "GP/2" and "GP (=0.74 cm) (refer to FIG. 3), respectively, with a shift amount "r"=3.4 cm when a distance L between the slider shaft and the objective lens 171 is "4 mm", the distance between the main beam and the sub-beam "in" is 5.0 μm, and the distance between the main beam and the sub-beam "out" is 10.0 μm.

The change state of the amplitudes of the differential push pull signals DPPin and DPPout will be described with reference to FIG. 4. FIG. 4 is a diagram showing a change state of the amplitude of each of the differential push pull signals DPPin and DPPout in the case of performing initial adjustment to set Δxin and Δxout to "GP/2" and "GP (=0.74 μm)" (refer to FIG. 3), respectively, with a shift amount "r"=3.4 cm when a distance L between the slider shaft and the objective lens 171 is "4 mm", the distance between the main beam and the sub-beam "in" is 5.0 μm, and the distance between the main beam and the sub-beam "out" is 10.0 μm. In the diagram, the horizontal axis shows the shift amount "r" in the radius axis direction of the center point of the objective lens 171 (plotting between the recording/reproduction radiuses "rmin" and "rmax" when the center point of the optical disk DK is set as r=First, as shown in FIG. 4, when the values Δxin and Δxout change as the shift amount "r" changes, a situation occurs such that the amplitude of each of the differential push pull signals DPPin and DPPout becomes "1" or less. It is known that if the signal amplitude value is less than about "1", accurate tracking correction in the DPP method in a DVD recorder or the like cannot be usually realized. Therefore, when it is assumed that the value "1" is a threshold TH of the signal amplitude, a situation occurs that the differential push pull signal DPPin or DPPout drops below the threshold TH with a change in the recording/reproduction position, and accurate tracking correction cannot be realized even when any of the signals is used (refer to FIG. 4).

On the other hand, the differential push pull signals DPPin and DPPout have the complementary relation (that is, a proper phase difference occurs) under the environment that the irradiation positions of the sub-beams "in" and "out" (that is, the light condensing spots on the optical disk DK) are properly initially adjusted. When the amplitude of one of the differential push pull signals DPPin and DPPout becomes "1" or less, that of the other signal becomes "1" or larger. Therefore, under the environment that such initial adjustment is made, by switching the signal used for tracking correction between the differential push pull signals DPPin and DPPout in accordance with the change in the shift amount "r" in the radial direction of the center of the objective lens 171, the signal amplitude value can be properly prevented from becoming the threshold TH or less.

In the case shown in FIG. 4, it is understood that all of the signal amplitude values of the differential push pull signals DPPin and DPPout are equal to or larger than the threshold TH "1" in the zone between the shift amounts r1 and r2, and the zone between the shift amounts r3 and r4. In such a case, any one of the differential push pull signals DPPin and DPPout can be selectively used. By assigning weights to the signals DPPin and DPPout and obtaining the sum of the signals DPPin and DPPout, a sudden fluctuation in the signal amplitude can be also suppressed.

Therefore, in the embodiment, a signal for tracking correction (hereinbelow, also called "tracking error signal Ste") is generated by the following Equation 8.

$$Ste = Kin \times DPPin - Kout \times DPPout \quad [\text{Equation 8}]$$

By changing the value of weighting coefficients "kin" and "kout" in Equation 8 on the basis of the shift amount "r", the amplitude of the tracking error signal Ste is prevented from becoming the threshold TH or less and, in addition, sudden fluctuation in the amplitude of the tracking error signal Ste is prevented.

Some patterns as modifications of the coefficients "kin" and "kout" (refer to FIGS. 6 and 9) may be considered. They will be described in detail later.

In the case of actually constructing the device, to obtain the amplitude characteristics of the differential push pull signals DPPin and DPPout as shown in FIG. 4, it is necessary to perform the initial adjustment so as to satisfy predetermined conditions as described above. A concrete method of the initial adjustment will be described in detail later.

The elements shown in FIG. 2 will be described in detail below.

The signal processor SP has an input terminal. The signal processor SP performs a signal process of a predetermined format on data entered from the outside via the input terminal and outputs the processed signal to the controller C.

The controller C is constructed mainly by a CPU (Central Processing Unit) and controls the components of the information recording/reproducing apparatus RP. For example, in the case of recording data onto the optical disk DK, the controller C outputs a drive signal for recording corresponding to the data input from the signal processor SP to the drive circuit D. In the case of reproducing data recorded on the optical disk DK, the controller C outputs a drive signal for reproduction to the drive circuit D.

The drive circuit D is constructed mainly by an amplification circuit, amplifies the drive signal input from the controller C, and supplies the amplified drive signal to the optical pickup device PU. The amplification factor in the drive circuit D is controlled by the controller C. At the time of recording data to the optical disk DK, the amplification factor is controlled so that a light beam is output with a recording power (an energy amount causing a phase change or a dye change in a dye-change or phase-change optical disk DK). At the time of reproducing data, the amplification factor is controlled so that a light beam is output with a reproduction power (an energy amount which does not cause the dye change or the like).

The optical pickup device PU is used to irradiate the optical disk DK in the DVD format with a light beam on the basis of the control signal supplied from the drive circuit D to record/reproduce the data to/from the optical disk DK.

To realize the function, the optical pickup device PU of the embodiment includes the semiconductor laser 11 for outputting a light beam (wavelength of about 650 nm) which is linearly polarized (for example, P-polarized) in a predetermined direction on the basis of the drive signal supplied from the drive circuit D, the diffractive grating 12, a PBS (polarizing beam splitter) 13, a collimator lens 14, a λ/4 plate 15, a mirror 16, an actuator 17, an error detection lens 18, and an OEIC 19. Those optical elements are initially adjusted so as to satisfy the relations of the differential push pull signals DPPin and DPPout shown in FIG. 4.

The diffractive grating 12 makes the light beam emitted from the semiconductor laser 11 diffract, thereby emitting five beams; a main beam, sub-beams "in" (inA and inB) and sub-beams "out" (outA and outB). The diffractive grating 12 has to be subject to the initial adjustment. The initial adjustment method will be described later.

The PBS 13 is an optical element that transmits, for example, a P-polarized incident beam and reflects an S-polarized beam. The PBS 13 guides the main beam, the sub-beams "in", and the sub-beams "out" from the diffractive grating 12 to the collimator lens 14 and guides reflection light from the surface of the optical disk DK of those beams (hereinbelow, reflection light of the main beam, the sub-beams "in", and the sub-beams "out" will be called "main reflection light", "sub reflection light "in"", and "sub reflection light "out"") to the error detection lens 18. The collimator lens 14 is an optical element for converting a part of the incident main beam and sub-beams passed through the PBS 13 to an almost parallel rays and converging the reflection light from the optical disk DK. The λ/4 plate 15 is an optical element for performing interconversion between linear polarization and circular polarization. By the function of the λ/4 plate 15, the polarization direction changes only by π/2 between an outward path and a return path. The outward path and the return path are separated by the PBS 13. The "outward path" denotes an optical path of a light beam traveling from a light source unit 1 toward the optical disk DK. The "return path" denotes an optical path of reflection light traveling from the optical disk DK toward the OEIC 19.

The actuator 17 has the objective lens 171, an objective lens holder 172 for fixing the objective lens and, further, a movable mechanism 173 for integrally moving the objective lens holder 172. The actuator 17 changes the position of the objective lens on the basis of a correction signal supplied from an actuator driver AD, thereby realizing tracking servo and focus servo.

The error detection lens 18 is constructed by a cylindrical lens and gives astigmatism to tracks of the optical disk DK at the angle of about 45°. The OEIC 19 is constructed by, for example, a photodiode. The error detection lens 18 receives the main reflection light and the sub reflection light "in" and "out" from the error detection lens 18, and outputs the light reception signal to the controller C and an error signal generator EG and a weight determining unit WD.

The playback unit P has, for example, an adder and an amplifier, generates a reproduction RF signal on the basis of the light reception signal supplied from the OEIC 19, performs predetermined signal process on the reproduction RF signal, and outputs the processed signal to an output terminal OUT.

The servo unit S is an element for controlling the actuator 17 on the basis of the light reception signal supplied from the OEIC 19 in the optical pickup device PU, and has the error signal generator EG, the weight determining unit WD, and the actuator driver AD.

The weight determining unit WD as one of those elements determines the coefficients kin and kout in the Equation 8 on the basis of the shift amount "r" in the radial direction of the objective lens 171 (more concretely, the shirt amount "r" in the radial axis direction from the center point of the optical disk DK shown in FIG. 3), and supplies control signals indicative of the determined coefficients kin and kout to the error signal generator EG.

The error signal generator EG generates the tracking error signal Ste and a focus error signal Sfe on the basis of the light reception signals supplied from the OEIC 19, and outputs the signals to the actuator driver AD. The actuator driver AD controls the actuator 17 on the basis of an error signal supplied from the error signal generator EG.

(2) Concrete Configuration of Servo Unit B

With reference to FIG. 5, a concrete configuration of the servo unit S and the OEIC 19 will be described in detail.

In the embodiment, as shown in the diagram, the OEIC 19 has (i) a first light receiving unit 19A for receiving the main reflection light, (ii) a second light receiving unit 19B for receiving the sub reflection light inA, (iii) a third light receiving unit 19C for receiving the sub reflection light inB, (iv) a fourth light receiving unit 19D for receiving the sub reflection light outA, and (v) a fifth light receiving unit 19E for receiving the sub reflection light outB. The first light receiving unit 19A has a four-division shape, and each of the second to fifth light receiving units 19B to 19E has a halved shape. With respect to the divided areas a, b, c, and d of the first light receiving unit 19A, the areas "a" and "c" are connected to the input stage of an adder 20A-1, and the areas "b" and "d" are connected to the input stage of an adder 20A-2. The output stages of the adders 20A-1 and 20A-2 are connected to the input stage of a subtractor 21A. As a result, from the subtractor 21A, a signal is output as the push pull signal PPmain corresponding to the main beam.

$$PP\text{main}=(a+c)-(b+d) \quad \text{[Equation 9]}$$

The push pull signal is supplied to an inner DPP signal generator 22in and an outer DPP signal generator 22out (in Equation 9, a, b, c, and d indicate light reception signal levels in the corresponding areas).

With respect to the second to fifth light receiving units 19B to 19E, (i) the second light receiving unit 19B is connected to the input stage of a subtractor 21B, (ii) the third light receiving unit 19C is connected to the input stage of a subtractor 21C, (iii) the fourth light receiving unit 19D is connected to the input stage of a subtractor 21D, and (iv) the fifth light receiving unit 19E is connected to the input stage of a subtractor 21E. As a result, push pull signals PPina, PPinb, PPouta, and PPoutb corresponding to the sub-beams inA, inB, outA, and outB are output from the subtracters 21B, 21C, 21D, and 21E, respectively.

The inner DPP signal generator 22-in has an adder 221-in, an amplifier 222-in, and a subtractor 223-in. The outer DPP signal generator 22-out has an adder 221-out, an amplifier 222-out, and a subtractor 223-out. The inner DPP signal generator 22-in generates the differential push pull signal DPPin corresponding to the sub-beam "in" on the basis of the following Equations 10 and 11.

$$DPP\text{in}=PP\text{main}-G\text{in}(PP\text{in}a-PP\text{in}b) \quad \text{[Equation 10]}$$

$$DPP\text{out}=PP\text{main}-G\text{out}(PP\text{out}a-PP\text{out}b) \quad \text{[Equation 11]}$$

As a result, the differential push pull signal DPPin generated by the inner DPP signal generator 22in is supplied to an amplifier 231in of a coefficient multiplier 23. The differential push pull signal DPPout generated by the outer DPP signal generator 22out is supplied to an amplifier 231out. In the equations, (i) "Gin" denotes a coefficient according to the diffracted light amount of the main beam and the sub-beams "in", and (ii) "Gout" denotes a coefficient according to the diffracted light amount of the main beam and the sub-beams "out". In the embodiment, the ± first-order beams are used as the sub-beams "in", and the ± second-order beams are used as the sub-beams "out". The light amount of the sub-beam "in" and that of the sub-beam "out" are different from each other. Consequently, "Gin" and "Gout" are set as values in which the diffracted light amount ratio is considered.

The amplifiers 231in and 231out provided in the coefficient multiplier 23 amplify the differential push pull signals DPPin and DPPout input from the DPP signal generators 22 in and 22out, respectively, on the basis of a control signal supplied from the weight determining unit WD. As a result, from the amplifiers 231in and 231out, the differential push pull signals DPPin and DPPout multiplied with the coefficients kin and kout shown in the Equation 8 are output, respectively. The tracking error signal Ste expressed by the Equation 8 is supplied from an adder 24 to the actuator driver AD. In such a manner, tracking control is realized.

Any method can be used as the method of generating the focus error signal in a focus error signal generator 25. For example, in case of employing astigmatism, it is sufficient to provide a cylindrical lens as the error detection lens 18 and generate a focus error signal on the basis of the light reception signal output from the first light receiving unit 19A.

On the other hand, the weight determining unit WD for controlling the coefficient multiplier 23 has a shift amount detector RD and a coefficient determining unit CC. The shift amount detector RD as one of the elements calculates the shift amount "r" (refer to FIG. 3) from the center point of the optical disk DK of the center point of the objective lens 171 and supplies a shift amount signal indicative of the calculation result to the weight determining unit WD.

Any method can be used as a concrete method of detecting the shift amount "r". For example, in a state of performing a track search before start of recording/reproduction of data to/from the optical disk DK, (method "a") by counting the number of zero cross times of the light reception signal output from the first light receiving unit 19A, the number of tracks of movement from the innermost radius of the optical disk DK is calculated, and the shift amount "r" may be calculated on the basis of the number of tracks of movement, or (method "b") a table for converting a recording address read from the optical disk DK to a shift amount is held and, the shift amount "r" may be calculated on the basis of the recording address read from the optical disk DK. After recording/reproduction of data to/from the optical disk DK starts, (method "c") the shift amount "r" may be calculated on the basis of lapse time, or (method "d") the number of revolutions of a not-shown spindle motor is counted and the shift amount "r" may be calculated on the basis of the counted number. Further, (method "e") the shift amount "r" may be calculated on the basis of a wobble signal included in the light reception signal. In case of employing the method "c", when the angular speed is constant, the shift amount fluctuates directly proportional to time. In the case where the linear speed is constant, it is sufficient to calculate the length of one round from the shift amount "r" of the recording start position, specify the time required for one round on the basis of the calculated length, and calculate the shift amount "r" on the basis of the specified time and the lapse time.

The coefficient determining unit CC determines the coefficients kin and kout in the Equation 8 on the basis of the shift amount signal supplied from the shift amount detector RD, supplies the control signals indicative of the coefficients kin and kout to the coefficient multiplier 23, and makes the coefficients in the coefficient multiplier 23 vary.

Figure 6:
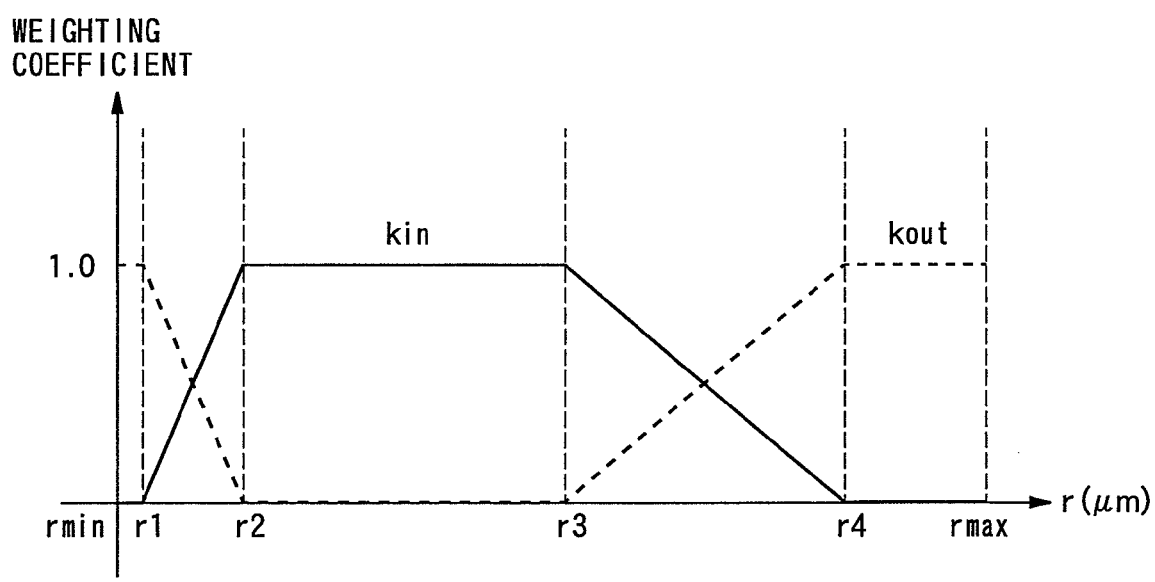
FIG. 6 A graph showing changes in coefficients kin and kout in the embodiment.

A method of determining the coefficients kin and kout in the coefficient determining unit CC will be described with reference to FIG. 6. FIG. 6 is a graph showing changes in the values of the coefficients kin and kout. In the diagram, changes in the coefficient kin is shown by the solid line, and changes in the coefficient kout is shown by a broken line. In FIG. 6, the shift amount "r" is indicated on the horizontal axis, the coefficient value is indicated by the vertical axis, and the shift amounts "r" corresponding "r1" to "r4" in FIG. 4 are shown on the horizontal axis.

As shown in FIG. 4, the differential push pull signals DPPin and DPPout have the following relations.

(Section 1)

Shift amount "r"=from rmin to r1 and from r4 to rmax, the differential push pull signal DPPin is equal to or less than the threshold TH, and DPPout is equal to or larger than the threshold TH.

(Section 2)

Shift amount "r"=between "r1" and "r2", and the differential push pull signals DPPin and DPPout are equal to or larger than the threshold TH.

(Section 3)

Shift amount "r"=between "r2" and "r3", the differential push pull signal DPPin is equal to or larger than the threshold TH, and DPPout is equal to or less than the threshold TH.

(Section 4)

Shift amount "r"=between "r3" and "r4", and the differential push pull signals DPPin and DPPout are equal to or larger than the threshold TH.

In the section 1 under the environment where the relations are satisfied, in case of using only the differential push pull signal DPPout, the signal amplitude can be maximized. In the section 3, in case of using only the differential push pull signal DPPin, the signal amplitude can be maximized. In the sections 2 and 4, the differential push pull signals DPPin and DPPout increase and decrease while maintaining the value of the threshold TH or more.

In view of the relations, in the embodiment, the coefficients kin and kout are set in such a manner that, as shown in FIG. 6, (a) section 1: kin="0", kout="1", (b) section 2: kin=(r−r1)/(r2−r1), kout=(r2−r)/(r2−r1), (c) section 3: kin="1", kout="0", (d) section 4: kin=(r4−r)/(r4−r3), kout=(r−r3)/(r4−r3). To realize such setting of the coefficients kin and kout, the coefficient determining unit CC has a coefficient setting table TBL shown in FIG. 7. On the basis of the coefficient setting table TBL, the coefficient determining unit CC calculates the coefficients kin and kout corresponding to the shift amount signal from the shift amount detector RD. The coefficient determining unit CC supplies the control information indicative of the calculated coefficients kin and kout to the coefficient multiplier 23 to control the amplification factors in the multipliers 231in and 231out. As a result, the tracking error signal Ste output from the adder 24 in the error signal generator EG changes, and accurate tracking correction can be realized.

(3) Principle of Initial Adjustment of Optical Beam Irradiation Position

The concrete configuration of the information recording/reproducing apparatus RP in the first embodiment of the invention has been described above. The method of initially adjusting the irradiation positions of the main beam, the sub-beams "in", and the sub-beams "out" to the surface of the optical disk DK and the principle of the initial adjustment will now be described.

In case where the shift axis of the objective lens 171 is in a position shifted in the tangential direction of the optical disk from the slider shaft like in the information recording/reproducing apparatus RP in the embodiment, if the initial adjustment of the beam irradiation position is not performed properly, both of the differential push pull signals DPPin and DPPout decrease below the threshold TH, and a desired tracking error signal Ste may not be obtained.

Figure 8:
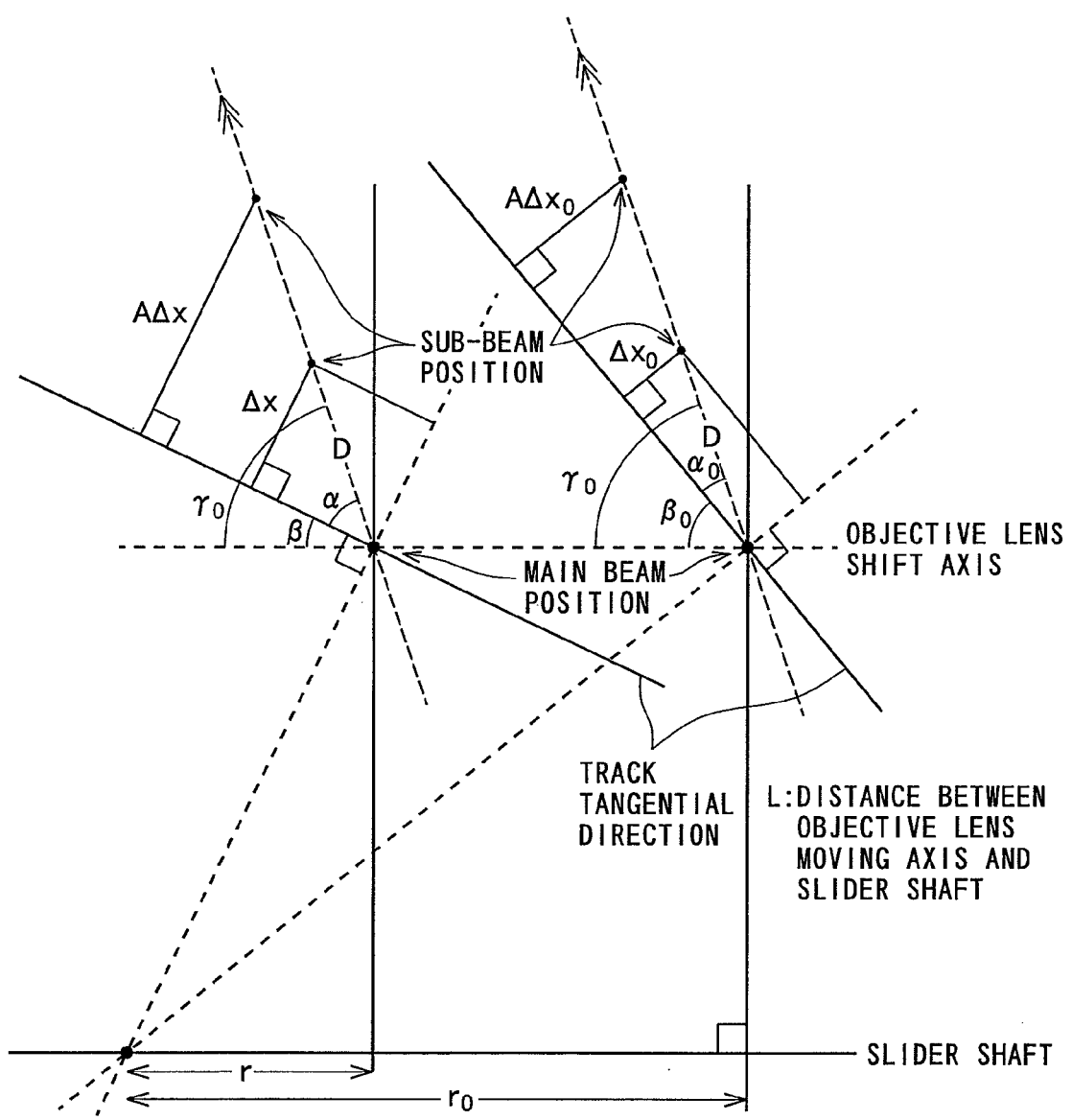
FIG. 8 A diagram showing the positional relations of light condensing spot positions of a main beam, sub-beams "in", and sub-beams "out" emitted to the surface of an optical disk DK, the slider shaft, and the objective lens 171 in the information recording/reproducing apparatus RP in the case where the main beam, the sub-beams "in", and the sub-beams "out" are arranged on a straight line in the embodiment.
Figure 9:
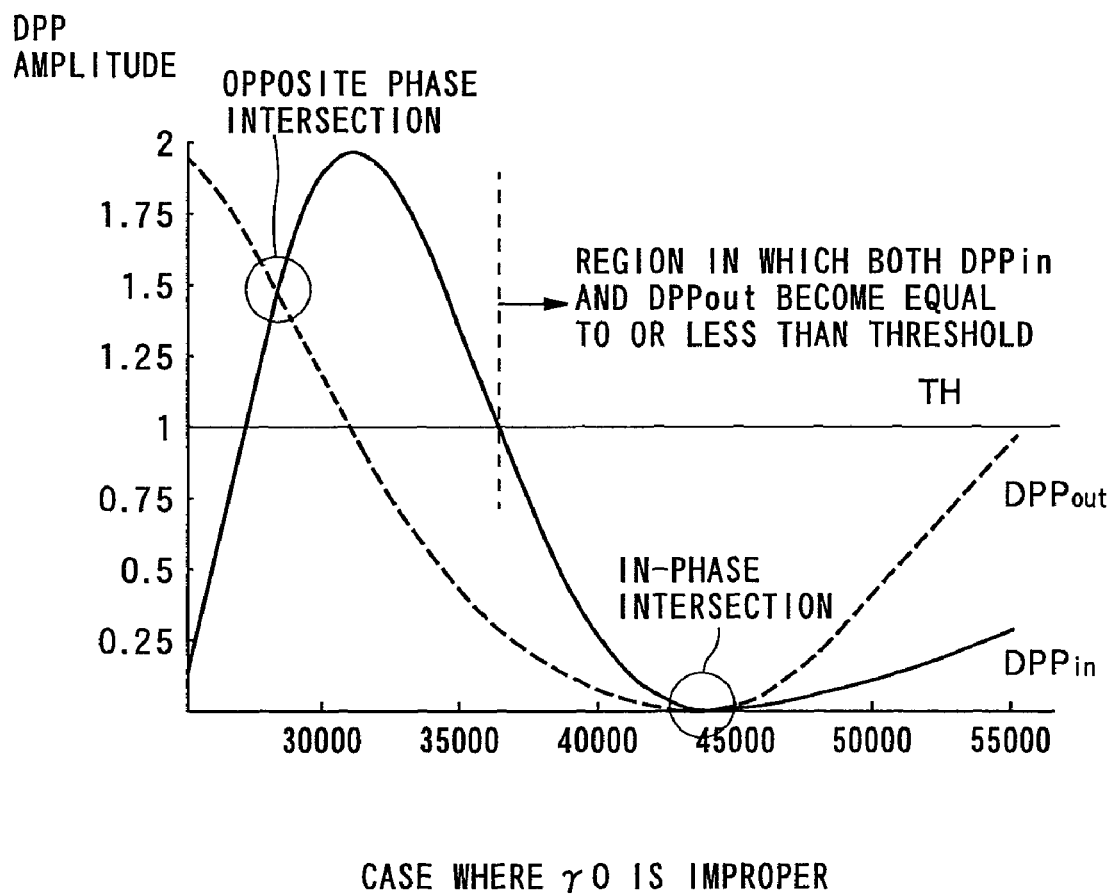
FIG. 9 A diagram showing a change state of the amplitude of each of the differential push pull signals DPPin and DPPout obtained when the value of an angle γ0 is improper as an initial adjustment value in the embodiment.

This point will be described with reference to FIGS. 8 and 9. As shown in FIG. 8, it is assumed that the angle formed by (i) the shift axis of the objective lens 171 and (ii) the axis connecting the irradiation positions of the main beam and the sub-beams "in" and "out" is "γ0". In this case, the irradiation positions of the sub-beams "in" and "out" change depending on the value of the angle γ0. Consequently, if the value of the angle γ0 is not properly adjusted at the time of the initial adjustment, there is the possibility that both of the differential push pull signals DPPin and DPPout fall below the threshold TH (="1") as shown in FIG. 9.

On the other hand, the value of the angle γ0 depends on the mounting angle of the diffractive grating 12. Consequently, by obtaining the range of the angle γ0 at which at least one of the differential push pull signals DPPin and DPPout exceeds the threshold TH in the radius of recording and reproducing ("rmin" to "rout") and setting the angle of the diffractive grating 12 so as to lie in the range, occurrence of such a situation can be prevented.

The conditions of setting the angle γ0 at which any one of the differential push pull signals DPPin and DPPout exceeds the threshold TH without fail will be described below. In the following description, it is assumed that light condensing spots of all of the beams are on a straight line, and the distance between the main beam and the sub-beam "out" is A times (A: constant) as large as the distance between the main beam and the sub-beam "in". Therefore, when Δxin=Δx, the relation of Δxout=AΔx is satisfied (refer to FIG. 8).

In this case, from FIG. 8, Δx(r) is expressed as Equation 12. To obtain the condition of the angle γ0, the relations of Equations 13 and 14 are used. α0 denotes an angle measured from a track on which the main beam exists.

$$\Delta x(r) = D\sin\left(\alpha_0 - \tan^{-1}\left(\frac{L}{r_0}\right) + \tan^{-1}\left(\frac{L}{r}\right)\right) \quad \text{[Equation 12]}$$

$$\alpha_0 = \sin^{-1}\left(\frac{\Delta x(r)}{D}\right) + \tan^{-1}\left(\frac{L}{r}\right) - \tan^{-1}\left(\frac{L}{r}\right) \quad \text{[Equation 13]}$$

$$\gamma_0 = \alpha_0 - \tan^{-1}\left(\frac{L}{r_0}\right) + \frac{\pi}{2} \quad \text{[Equation 14]}$$

At the time of determining the range of the angle γ0, the following points have to be noted.

<Point "a" of Notice>

The amplitude of at least one of the differential push pull signals DPPin and DPPout has to be equal to or larger than the threshold TH in the radius of recording and reproduction.

<Point "b" of Notice>

In a case where the intersection exists between the differential push pull signals DPPin and DPPout in the reproduction radius, the amplitude value at the intersection has to be always the threshold TH or larger.

<Point "c" of Notice>

As expressed in the Equations 6 and 7, the amplitudes of the two differential push pull signals DPPin and DPPout are a cosine function with respect to the radius. Between the differential push pull signals DPPin and DPPout, there are two kinds of intersections, an in-phase intersection (that is, the polarity of a change in the amplitude of signals are the same accompanying the same change in the radial direction.), and opposite-phase intersection (that is, the polarity of a change in the amplitude of signals are the opposite accompanying the same change in the radial direction.)

In the following, while noting the points, the following three conditions are set in the embodiment as conditions under which any one of the differential push pull signals DPPin and DPPout becomes the threshold TH or larger in the radius of recording and reproduction without fail.

(a) Condition 1

First, the first condition is that the in-phase intersection does not exist in the radius of recording and reproduction. Even when the in-phase intersection exists in the radius of recording and reproduction, if the value is equal to or larger than the threshold TH, it is sufficient. Consequently, such a range should be normally included. However, if such a range is included, the number of condition values becomes very large, and it becomes difficult to understand. It is also known that the range of the angle $\gamma 0$ satisfying the point "a" to note when the in-phase intersection exists is very narrow. Therefore, all of the cases where the in-phase intersection exists in the radius of recording and reproduction are excluded.

(b) Condition 2

The second condition is that the value of the amplitude of each of the differential push pull signals DPPin and DPPout is equal to or larger than the threshold TH at the opposite-phase intersection in the radius of recording and reproduction.

(c) Condition 3

Even when the above-described two conditions are satisfied, there is a case where both of the signals fall below the threshold TH at the innermost radius and the outermost radius. Therefore, as "the third condition, a condition is added such that at least one of the differential push pull signals DPPin and DPPout exceeds the threshold TH at the innermost radius and the outermost radius without fail.

Initial adjustment values for realizing the conditions will be described below.

(a) Regarding Condition 1

Under the condition that the in-phase intersection does not exist, the range of the angle $\gamma 0$ is determined by the following equation.

$$\Delta xout - \Delta xin = (A-1)\Delta x = nGP \quad \text{[Equation 15]}$$

The in-phase intersection is generated when the following condition is satisfied.

(where n denotes an integer and, when $\Delta xn = \Delta x$, $\Delta xout = A\Delta x$ (that is, the light condensing spots of the main beam and the sub-beams "in" and "out" are on a straight line.) Consequently, it is sufficient not to satisfy the Equation within the radius of recording and reproduction. Usually, when the main beam is on a groove track, the sub-beams "in" are applied to land tracks neighboring the groove track. Therefore, when $0 < \Delta xout - \Delta xin < GP$ is satisfied within the radius of recording and reproduction, no in-phase intersection exists in the radius of recording and reproduction.

[Equation 16]

That is, it is sufficient to satisfy the following equation.

$$0 < \Delta x(r) < GP/(A-1)$$

When the Equations 13 and 14 are used, the range of $\gamma 0$ becomes as follows.

$$\frac{\pi}{2} - \tan^{-1}\left(\frac{L}{r}\right) < \gamma_0 < \sin^{-1}\left[\frac{GP}{(A-1)D}\right] + \frac{\pi}{2} - \tan^{-1}\left[\frac{L}{r}\right] \quad \text{[Equation 17]}$$

Figure 10:
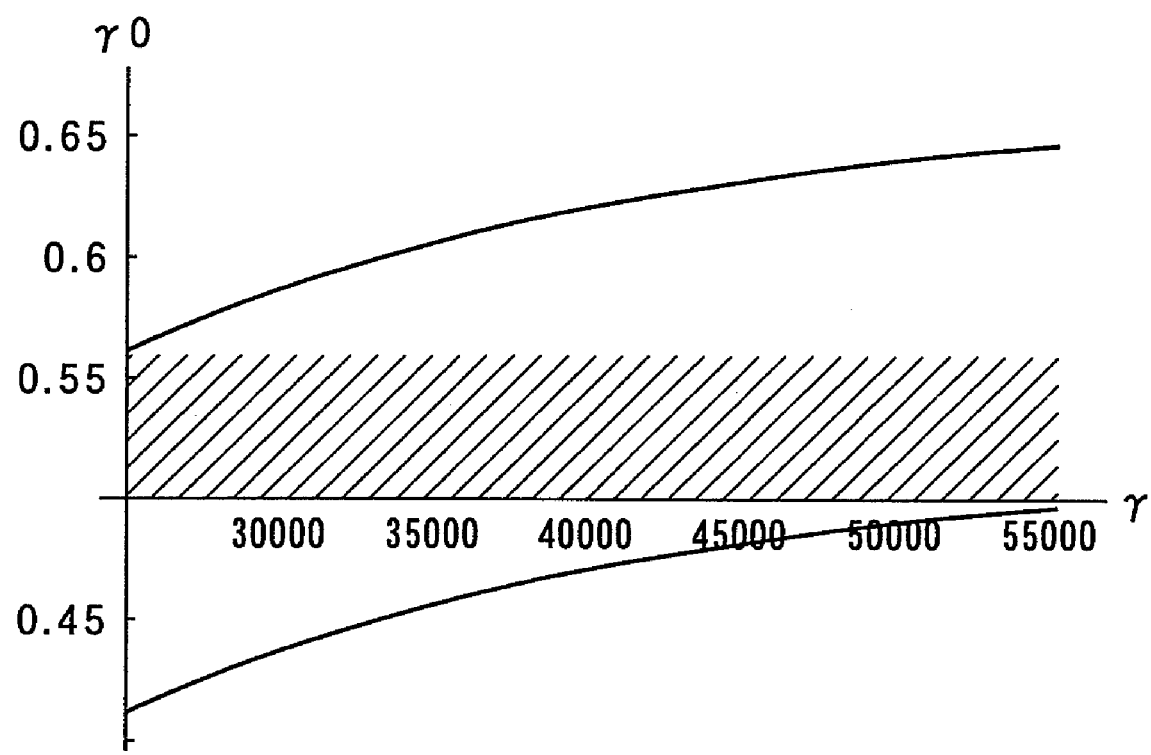
FIG. 10 A graph showing the relation of Equation 17 in the embodiment is plotted in the radius of recording and reproduction.

The lower and upper limits of the angle $\gamma 0$ are plotted on a graph having the horizontal axis "r" (from rmin to rmax) as shown in FIG. 10.

Therefore, the angle $\gamma 0$ satisfying the condition irrespective of the value "r" in the radius of recording and reproduction has to be set in the hatched range. The condition is expressed by the following equation.

$$\frac{\pi}{2} - \tan^{-1}\left(\frac{L}{r\max}\right) < \gamma 0 < \sin^{-1}\left[\frac{GP}{(A-1)D}\right] + \quad \text{[Equation 18]}$$

$$\frac{\pi}{2} - \tan^{-1}\left(\frac{L}{r\min}\right)$$

This is the first condition of the angle $\gamma 0$.

(b) Regarding Condition 2

At the opposite-phase intersection, $\Delta x$ is generated when the following is satisfied.

$$(A+1)\Delta x = mGP \quad \text{[Equation 19]}$$

(where m denotes an integer.) Consequently, $\Delta xc$ is expressed as follows.

$$\Delta xc = mGP/(A+1) \quad \text{[Equation 20]}$$

where m denotes an integer corresponding to the intersection. The amplitude of the differential push pull signal DPPin and that of the differential push pull signal DPPout are the same at the opposite-phase intersection. To make the values equal to or larger than the threshold TH, "m" has to satisfy the following equation.

$$DPP = 1 - \cos\left(2\pi\frac{\Delta xc}{GP}\right) = 1 - \cos\left(\frac{2\pi m}{A+1}\right) \geq TH \quad \text{[Equation 21]}$$

(where TH denotes a threshold TH).

From the equation, the range of "m" is calculated as follows.

$$\frac{2\pi n + \cos^{-1}(1 - TH)}{2\pi}(A+1) \leq \quad \text{[Equation 22]}$$

$$m \leq \frac{2\pi(n+1) - \cos^{-1}(1 - TH)}{2\pi}(A+1)$$

(where n denotes an integer.)

As understood from FIG. 8, $(A+1)\Delta x$ is the maximum at $r=r\min$ and is the minimum at $r=r\max$. Therefore, the minimum and maximum values of "m" can be expressed as follows.

$$m_{min} = \text{Ceil}\left[\frac{A+1}{GP}\Delta x(r_{max})\right] \quad \text{[Equation 23]}$$

$$m_{max} = \text{Floor}\left[\frac{A+1}{GP}\Delta x(r_{min})\right] \quad \text{[Equation 24]}$$

That is, m is an integer satisfying $m_{min} \leq m \leq m_{max}$.

Therefore, to make m lie in the range of the Equation 22, it is sufficient to satisfy the following Equations 25 and 26.

$$m_{min} \geq \frac{2\pi n + \cos^{-1}(1-TH)}{2\pi}(A+1) \quad \text{[Equation 25]}$$

$$m_{max} \geq \frac{2\pi(n+1) - \cos^{-1}(1-TH)}{2\pi}(A+1) \quad \text{[Equation 26]}$$

The Equation 25 is modified as follows.

$$\frac{A+1}{GP}\Delta x(r_{max}) \geq \text{Floor}\left\{\frac{2\pi n + \cos^{-1}(1-TH)}{2\pi}(A+1)\right\} \quad \text{[Equation 27]}$$

From the Equation 27, the range of $\Delta x(r_{max})$ is obtained as follows.

$$\Delta x(r_{max}) \geq \frac{GP}{A+1}\text{Floor}\left\{\frac{2\pi n + \cos^{-1}(1-TH)}{2\pi}(A+1)\right\} \quad \text{[Equation 28]}$$

Similarly, by modifying the Equation 26, the range of $\Delta x(r_{min})$ is obtained as follows.

$$\Delta x(r_{min}) \leq \frac{GP}{A+1}\text{Ceil}\left\{\frac{2\pi(n+1) - \cos^{-1}(1-TH)}{2\pi}(A+1)\right\} \quad \text{[Equation 29]}$$

By using the Equations 13 and 14, the range of the angle $\gamma 0$ is obtained from the Equations 28 and 29 as follows.

$$\sin^{-1}\left\{\frac{GP}{D(A+1)}\text{Floor}\left\{\frac{2\pi n + \cos^{-1}(1-TH)}{2\pi}(A+1)\right\}\right\} - \tan^{-1}\left(\frac{L}{r_{max}}\right) + \frac{\pi}{2} \leq \gamma_0 \leq \sin^{-1}\left\{\frac{GP}{D(A+1)}\text{Ceil}\left\{\frac{2\pi(n+1) - \cos^{-1}(1-TH)}{2\pi}(A+1)\right\}\right\} - \tan^{-1}\left(\frac{L}{r_{min}}\right) + \frac{\pi}{2} \quad \text{[Equation 30]}$$

This is the second condition of the angle $\gamma 0$ (where n is an integer).

(c) Regarding Condition 3

The range of the angle $\gamma 0$ is obtained from the condition that the amplitude of any one of the differential push pull signals DPPin and DPPout is equal to or larger than the threshold TH at the innermost and outermost radiuses.

From the condition that the differential push pull signals DPPin is equal to or larger than the threshold TH at the innermost radius, the following is obtained.

$$1 - \cos\left(2\pi\frac{\Delta x(r_{min})}{GP}\right) \geq TH \quad \text{[Equation 31]}$$

By modifying the Equation 31, the range of $\Delta x(r_{min})$ is expressed as follows.

$$\frac{2\pi n_{in\,min} + \cos^{-1}(1-TH)}{2\pi}GP \leq \Delta x(r_{min}) \leq \frac{2\pi(n_{in\,min}+1) - \cos^{-1}(1-TH)}{2\pi}GP \quad \text{[Equation 32]}$$

(where ninmin denotes an integer.)

When r=rmin is substituted for the Equation 12, the following is obtained.

$$\Delta x(r_{min}) = D\sin\left(\alpha_0 - \tan^{-1}\left(\frac{L}{r_0}\right) + \tan^{-1}\left(\frac{L}{r_{min}}\right)\right) \quad \text{[Equation 33]}$$

The range of the angle $\gamma 0$ is obtained from the range of $\Delta x(r_{min})$ by using the Equations 13 and 14 as follows.

$$\sin^{-1}\left\{\frac{2\pi n_{in\,min} + \cos^{-1}(1-TH)}{2\pi D}GP\right\} - \tan^{-1}\left(\frac{L}{r_{min}}\right) + \frac{\pi}{2} \leq \gamma_0 \leq \sin^{-1}\left\{\frac{2\pi(n_{in\,min}+1) - \cos^{-1}(1-TH)}{2\pi D}GP\right\} - \tan^{-1}\left(\frac{L}{r_{min}}\right) + \frac{\pi}{2} \quad \text{[Equation 34]}$$

(where ninmin denotes an integer.)

Similarly, from the condition that the differential push pull signals DPPout is equal to or larger than the threshold TH at the innermost radius, the following is obtained.

$$\sin^{-1}\left\{\frac{2\pi n_{out\,min} + \cos^{-1}(1-TH)}{2\pi AD}GP\right\} - \tan^{-1}\left(\frac{L}{r_{min}}\right) + \frac{\pi}{2} \leq \gamma_0 \leq \sin^{-1}\left\{\frac{2\pi(n_{out\,min}+1) - \cos^{-1}(1-TH)}{2\pi AD}GP\right\} - \tan^{-1}\left(\frac{L}{r_{min}}\right) + \frac{\pi}{2} \quad \text{[Equation 35]}$$

(where noutmin denotes an integer.) Similarly, from the condition that the differential push pull signals DPPin is equal to or larger than the threshold TH at the outermost radius, the following is obtained.

$$\sin^{-1}\left\{\frac{2\pi n_{in\,max} + \cos^{-1}(1-TH)}{2\pi D}GP\right\} - \tan^{-1}\left(\frac{L}{r_{max}}\right) + \frac{\pi}{2} \leq \gamma_0 \leq \sin^{-1}\left\{\frac{2\pi(n_{in\,max}+1) - \cos^{-1}(1-TH)}{2\pi D}GP\right\} - \tan^{-1}\left(\frac{L}{r_{max}}\right) + \frac{\pi}{2} \quad \text{[Equation 36]}$$

(where ninmin denotes an integer.)

Further, from the condition that the differential push pull signals DPPout is equal to or larger than the threshold TH at the outermost radius, the following is obtained.

$$\sin^{-1}\left\{\frac{2\pi n_{out\,max} + \cos^{-1}(1-TH)}{2\pi AD}GP\right\} - \tan^{-1}\left(\frac{L}{r_{max}}\right) + \frac{\pi}{2} \leq$$

$$\gamma_0 \leq \sin^{-1}\left\{\frac{2\pi(n_{out\,max}+1) - \cos^{-1}(1-TH)}{2\pi AD}GP\right\} -$$

$$\tan^{-1}\left(\frac{L}{r_{max}}\right) + \frac{\pi}{2}$$

[Equation 37]

(where noutmax denotes an integer.)

Therefore, when the Equation 34 or 35 is satisfied at the innermost radius and the Equation 36 or 37 is satisfied at the outermost radius, the amplitude of at least one of the differential push pull signals DPPin and DPPout becomes equal to or larger than the threshold at the innermost or outermost radius. The condition 3 of the angle γ0 has been described above.

To make the amplitude of at least one of the differential push pull signals DPPin and DPPout equal to or larger than the threshold TH in the radius of recording and reproduction, all of the conditions 1, 2, and 3 have to be satisfied with respect to the angle γ0. FIG. 11A shows a concrete example of the range of the angle γ0 when parameters (GP=0.74 μm, L=4.0 mm, D=5.0 μm, rmin=2.5 cm, rmax=5.5 cm, A=2.0, TH=1) are substituted. FIG. 11B shows characteristics of the concrete differential push pull signals DPPin and DPPout in ranges.

It is understood that, as shown in FIG. 11B, at least one of the differential push pull signals DPPin and DPPout is equal to or larger than the threshold TH in the range where the value of the angle γ0 satisfies all of the conditions. In the information recording/reproducing apparatus RP of the embodiment, the angle of the diffractive grating 12 is adjusted so that the relations of the irradiation positions of the sub-beams "in" and "out" on the surface of the optical disk DK satisfy the above-described conditions.

Figure 12:
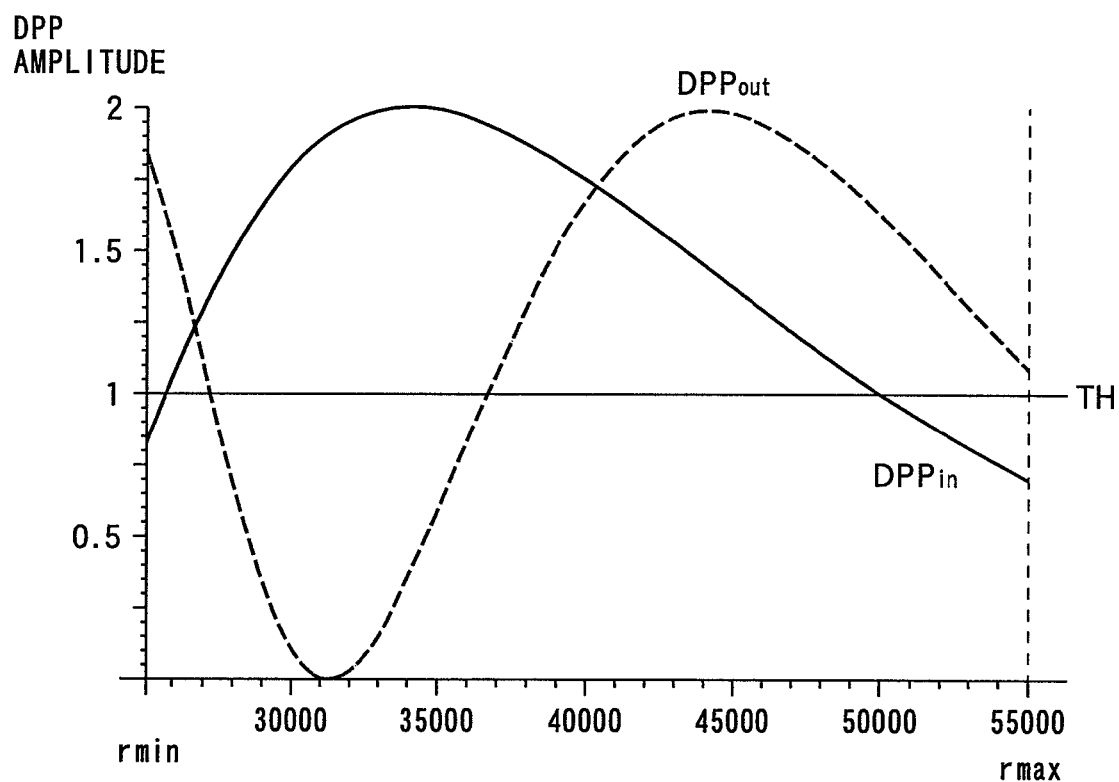
FIG. 12 A diagram showing a change state of the amplitude of each of differential push pull signals DPPin and DPPout under the environment that beam spots are not arranged on a straight line, and Δxin and Δxout are adjusted to "GP (=0.74 μm)/2" and "GP-0.1 μm" (refer to FIG. 3), respectively, with a shift amount "r"=3.4 cm when a distance L between the slider shaft and the objective lens 171 is "4 mm", the distance between the main beam and the sub-beam "in" is 5.0 μm, and the distance between the main beam and the sub-beam "out" is 10.0 μm.

The condition of the initial adjustment in the case where the light condensing spots are not disposed on a straight line will be described briefly. For example, as shown in FIG. 12, when the distance L between the slider shaft and the objective lens 171 is 4 mm, the distance between the main beam and the sub-beam "in" is 5.0 μm, and the distance between the main beam and the sub-beam "out" is 10.0 μm, by adjusting Δxin and Δxout to "GP (=0.74 μm)/2" and "GP-0.1 μm", respectively, with the shift amount "r"=3.4 cm, the DPP amplitude becomes equal to or larger than the threshold in the radius of recording and reproduction.

[1.2] Operation of First Embodiment

Next, concrete operation of the information recording/reproducing apparatus RP of the embodiment having the above-described configuration will be described. First, in a state where the optical disk DK is inserted in the information recording/reproducing apparatus RP, the user performs a predetermined input operation on the optical disk DK with a not-shown operating unit. The controller C supplies a drive signal to a not-shown spindle motor to rotate the spindle motor, starts supplying a drive signal to the drive circuit D so that a light beam for track search is output from the semiconductor laser 11, and executes a process for the track search.

The controller C executes a carriage servo to move the optical pickup PU to a position on the optical disk DK corresponding to an address in which data is to be recorded.

At this time, the shift amount "r" accompanying the track search is calculated in the shift amount detector RD, and the shift amount detector RD holds the calculation result.

After the track search is completed, the controller C supplies the control signal to the actuator driver AD to make a tracing servo loop enter a close state. As a result, the actuator driver AD shifts to a state of performing a tracking correcting operation based on the tracking error signal Ste supplied from the error signal generator EG. When the tracking servo loop enters the close state, the controller C re-sets the amplification factor in the drive circuit D to a value corresponding to the recording power, and starts supplying a drive signal corresponding to an input signal supplied from the input signal processor IP.

When the drive signal is supplied from the controller C in such a manner, supply of a signal from the drive circuit D to the semiconductor laser 11 starts and the semiconductor laser 11 emits a light beam (wavelength 650 nm, P polarization) of the recording power on the basis of the supplied signal. When the emitted light beam is incident on the diffractive grating 12, the light beam is diffracted by the diffractive grating 12, and five beams of the main beam (zeroth-order beam), the sub-beams inA and inB (±first-order beams), and the sub-beams outA and outB (±second-order beams) are emitted.

The main beam and the sub-beams "in" and "out" emitted from the diffractive grating 12 pass through the PBS 13 and are converted to almost parallel rays by the collimator lens 14. After that, the almost parallel rays are converted by the λ/4 plate 15 to circularly-polarized light. The circularly-polarized light is reflected upward in the diagram by the mirror 16 and is condensed by the objective lens 171 onto the surface of the optical disk DK (refer to FIG. 3). After the main beam and the sub-beams are condensed onto the surface of the optical disk DK, the main beam and the sub-beams are reflected by the surface of the optical disk DK and enter the objective lens 171.

The reflection light of the beams passes through the objective lens 171, is reflected by the mirror 16 to the left in the diagram, passes through the λ/4 plate 15, and is converted to linearly-polarized light (for example, S-polarized light) whose polarization direction changes from that in the outward path only by π/2. The light passes through the collimator lens 14, is reflected by the PBS 13 to the down in the diagram, and condensed to the OEIC 19 by the error detection lens 18. As a result, the main reflection light is condensed on the first light receiving unit 19A, the sub-reflection light inA is condensed on the second light receiving unit 19B, the sub-reflection light inB is condensed on the third light receiving unit 19C, the sub-reflection light outA is condensed on the fourth light receiving unit 19D, and the sub-reflection light outB is condensed on the fifth light receiving unit 19E. Light reception signals of levels corresponding to the light reception amounts of the reflection beams are output from the light receiving units 19A to 19E.

In this state, the shift amount detector RD calculates the shift amount "r" and outputs a shift amount signal. At this time, the shift amount detector RD calculates a displacement amount Δr from the shift amount held at the time of the track search, and adds the displacement amount Δr to the shift amount at the time of the track search, thereby calculating the shift amount "r" at present. The timing of outputting the shift amount signal from the shift amount detector RD and the mode of the shift amount signal are arbitrary. For example, the shift amount signal indicative of the shift amount "r" may be output in predetermined intervals. The voltage value supplied as a shift amount signal to the coefficient determining unit CC may be changed with a change in the shift amount "r".

When the shift amount signal is supplied from the shift amount detector RD, the coefficient determining unit CC calculates the coefficients kin and kout corresponding to the shift amount signals on the basis of the shift amount signal and the coefficient setting table TBL, and shifts to a state of supplying control signals indicative of the calculated coefficients kin and kout to the coefficient multiplier 23. The timing of outputting the control signal from the coefficient determining unit CC and the mode of the control signal are arbitrary. Control signals indicative of the coefficients kin and kout may be output in predetermined intervals, or the voltage value supplied as a control signal may be changed with a change in the coefficients kin and kout.

As a result of performing the processes, the amplification factors in the amplifiers 231in and 231out are changed in the coefficient multiplier 23 on the basis of the control signals supplied from the coefficient determining unit CC, and the signal value of the tracking error signal Ste supplied to the actuator driver AD changes. As a result, the amplitude of the tracking error signal Ste is always maintained at the threshold TH or larger, and proper tracking correction is realized.

In the information recording/reproducing apparatus RP of the embodiment, a light beam emitted from the semiconductor laser 11 is diffracted by the diffractive grating 12, thereby emitting five beams; (i) the main beam, (ii) the sub-beam inA, (iii) the sub-beam inB, (iv) the sub-beam outA, and the sub-beam outB. The five beams are condensed in positions shifted from each other by a predetermined amount in the circumferential direction of recording tracks from the radius axis passing through the center point of the optical disk DK. The reflection beams from the optical disk DK of the five beams are received. Light reception signals corresponding to the beams are output. The differential push pull signals DPPin and DPPout are generated. The generated differential push pull signals DPPin and DPPout are multiplied with the coefficients kin and kout. After that, by calculating the sum of the resultant signals, the tracking error signal Ste is generated. Consequently, the tracking error signal Ste as the linear sum of the differential push pull signals DPPin and DPPout whose signal amplitudes exceed the threshold TH is generated. As a result, at the time of executing the tracking correction by the DPP method using three beams, even in a case where fluctuations occur in the irradiation positions of the sub-beams on the tracks, reliable and proper tracking correction can be executed.

In the information recording/reproducing apparatus RP according to the embodiment, the coefficients kin and kout corresponding to the shift amount "r" are read from the setting table TBL and tracking error signals are generated on the basis of the coefficients kin and kout. Consequently, a process load in processing signals can be lessened, and fluctuations in the signal amplitude can be reduced. Thus, stable stacking correction can be realized.

In the embodiment, there is described the case of constructing the controller C, the drive circuit D, the reception light signal processor OP, and the actuator driver AD are constructed by an apparatus (for example, a CPU) separate from the optical pickup device PU has been described above. The components may be integrally formed with the optical pickup device PU.

By setting only "0" and "1" as the values of the coefficients kin and kout stored in the coefficient setting table TBL, the differential push pull signals DPPin and DPPout can be switched so that the values become simply larger.

In the embodiment, there has been described above the case of performing tracking correction. The CTC can be also realized by a similar method. In case of realizing the CTC, the sub-beams "in" and "out" have to be irradiated on the groove track being next to the groove track which main-beam is irradiated. Thus, it is noted that the irradiation positions of the beams have to be adjusted for the CTC.

[1.3] Modified Examples of First Embodiment (1) Modified Example 1

In the first embodiment, the configuration of making the outgoing light from the semiconductor laser 11 diffract by the diffractive grating 12 and emitting the five beams of the main beam, the sub-beams inA and inB, and the sub-beams outA and outB is employed. It is also possible to use a multi-array light source (that is, a light source unit obtained by forming five semiconductor lasers in one package) without using the diffractive grating 12. In particular, in a case where the light condensing spots of the five beams are not arrange linearly, the multi-array light source is preferable. Also in the case where the light condensing spots of the five beams are arranged linearly, the initial setting has to be performed in a manner similar to the first embodiment.

(2) Modified Example 2

In the foregoing embodiment, the coefficient setting table TBL shown in FIG. 7 is held in the coefficient determining unit CC. By determining the coefficients kin and kout on the basis of only the shift amount signal supplied from the shift amount detector RD, the mode of changing the coefficients kin and kout as shown in FIG. 6 is realized. It is also possible to determine the coefficients kin and kout by using not only the shift amount signal but also the differential push pull signals DPPin and DPPout. By employing such a method, a signal change which occurs in the tracking error signal Ste is further suppressed, and precision of tracking correction can be further improved.

Figure 13:
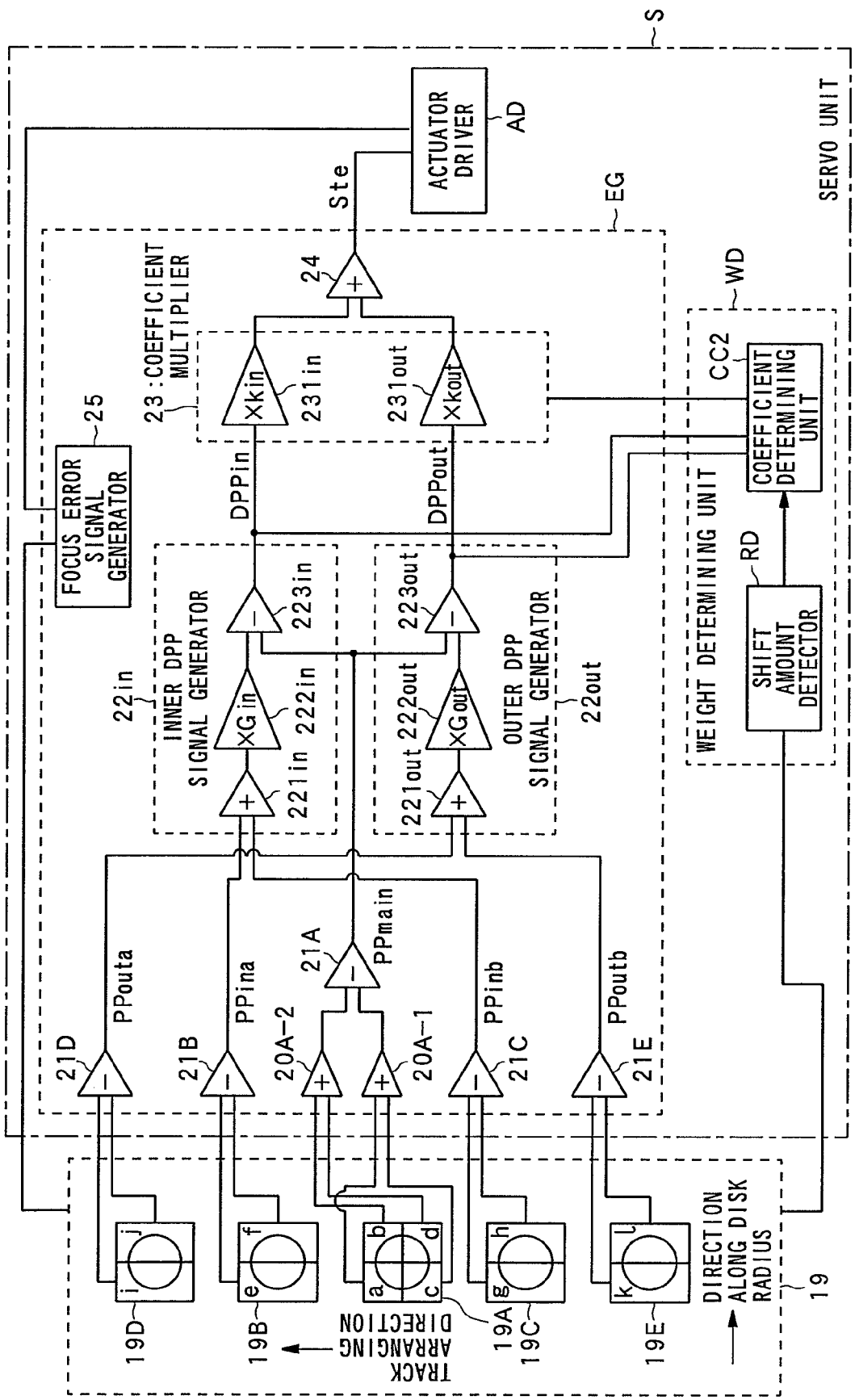
FIG. 13 A block diagram showing a concrete configuration of the servo unit S and the OEIC 19 in a modification 1 of the first embodiment.
Figure 14:
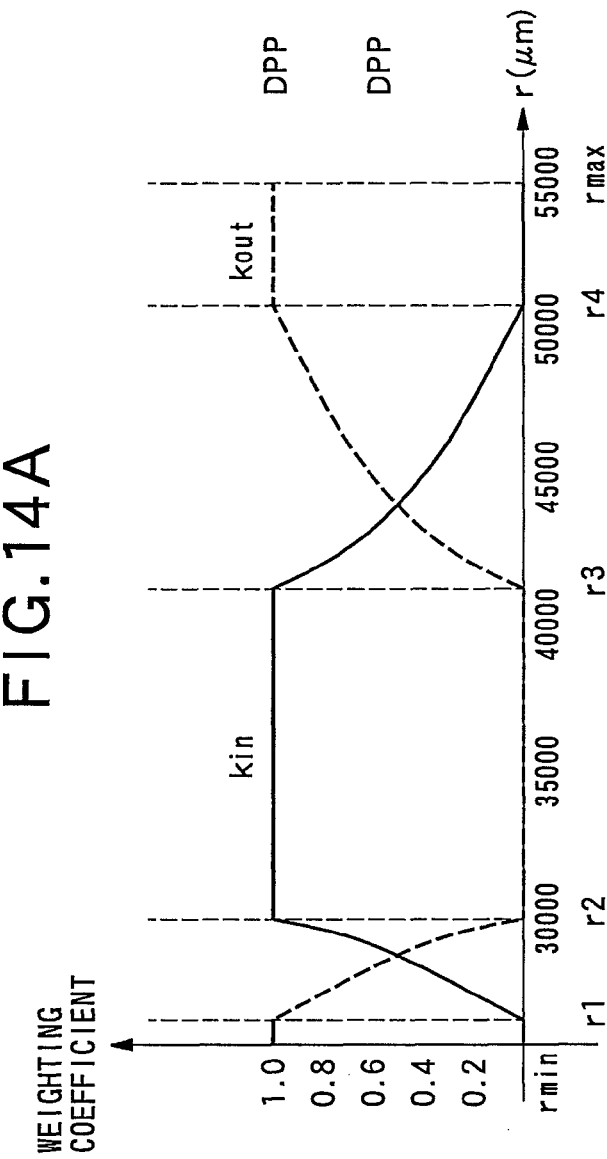
FIG. 14A A graph showing changes in the coefficients kin and kout in the modification 1.
FIG. 14B A diagram showing an example of data recorded in a coefficient determination table TBL2.

In order to realize such a function, in this Modified Example, as shown in FIG. 13, the differential push pull signals DPPin and DPPout are supplied from the inner DPP signal generator 22in and the outer DPP signal generator 22out to a coefficient determining unit CC2. The coefficient determining unit CC2 has a coefficient determination table TBL2 as shown in FIG. 14B. On the basis of the table TBL2, the coefficients kin and kout are calculated.

Specifically, as shown in FIG. 14B, settings are made as follows.

(a) Section 11 (shift amount "r"=from rmin to r1 and from r4 to rmax), kin="0", kout="1"

(b) Section 12 (shift amount "r"=between "r1" and "r2" and between "r3" and "r4"), kin=(TH-DPPin)/{2TH-(DPPin+DPPout), kout=(TH-DPPout)/{2TH-(DPPin+DPPout), (c) Section 13 (shift amount "r"=between "r2" and "r3"; kin="1", kout="0".

As a result, the set values of the coefficients kin and kout fluctuate as shown in FIG. 14A, and a mode of determining the coefficients kin and kout in consideration of also the amplitude change in the differential push pull signals DPPin and DPPout can be realized. By generating the tracking error signal Ste by substituting the coefficients kin and kout determined by the method into the Equation 8, fluctuations in the tracking error signal Ste can be further suppressed.

In such a manner, in the modification, fluctuations in the tracking error signal Ste are further suppressed, and accurate tracking correction can be realized.

In the first modification, the configuration of determining the coefficients kin and kout by using three values of the shift amount "r" and the differential push pull signals DPPin and DPPout is employed. It is also possible to generate the tracking error signal Ste on the basis of only the values of the differential push pull signals DPPin and DPPout. In this case, whether the amplitude values of the differential push pull signals DPPin and DPPout exceed the threshold TH or not is detected. When it is determined that the amplitude values exceed the threshold TH, the differential push pull signals DPPin and DPPout to be used may be switched. In this case, the tracking error signal Ste may be generated on the basis of the Equation 8.

(3) Modified Example 3

In the foregoing embodiment, the case of applying the technical idea of the present invention to a so-called one-beam one-disk type information recording/reproducing apparatus RP for recording/reproducing information to/from an optical disk DK of the DVD format has been described as an example. However, any recording format may be employed for the optical disk DK. For example, a case of recording/reproducing data to/from the optical disk DK of another recording format such as CD (Compact Disc), BD, or HD-DVD (High Definition-DVD) can be also realized by a configuration similar to that of the embodiment.

The number of recording formats for performing recording/reproduction by the information recording/reproducing apparatus RP can be arbitrarily determined. For example, by making outgoing light from the semiconductor laser 11 diffract to thereby convert the light to five beams by using the diffractive grating 12 also in the optical pickup device PU adapted to the four recording formats of CD, DVD, BD, and HD-DVD, and irradiating the optical disk DK with the five beams, a similar effect can be produced. The number of objective lenses 171 in this case is arbitrary. One compatible objective lens 171 may be used, or a plurality of objective lenses 171 may be provided. Also in this case, when one of the objective lenses 171 is provided so as to be shifted in the tangential direction from the slider shaft, a similar effect can be produced.

[2] Second Embodiment

In the first embodiment, the differential push pull signals DPPin and DPPout are used. By a similar method, a condition of the angle γ0 at which fluctuations in a cross talk signal (hereinbelow, called a "CTC signal") of adjacent tracks are suppressed can be obtained. This point will be described below. In a state where the main beam is applied to a groove track, when sub-beams are applied on groove tracks adjacent to the groove track, the CTC signal becomes the maximum. It is expressed by the following equation.

$$CTC_{in} = \exp\left[-\left(\frac{\Delta x}{TP} - 1\right)^2\right]$$ [Equation 38]

$$CTC_{out} = \exp\left[-\left(\frac{A\Delta x}{TP} - 1\right)^2\right]$$

(where TP denotes a track pitch.)

To determine the range of the angle γ0, the following points have to be noted.

Point "aa" to Note

In the second embodiment, a signal for CTC is generated from a pair of CTC signals corresponding to the sub-beams "in" and "out".

Point "bb" to Note

Any of the CTC signals has to exceed the threshold TH in the radius of reproduction.

Point "cc" to Note

To realize the CTC, CTC signals of the adjacent tracks read by the sub-beams "in" and "out" have to be larger than signals of the other tracks. Since the CTC signal is expressed by a Gaussian function, the CTC signal when the sub-beams "in" and "out" are in the center of a land track serves as the threshold TH.

Figure 15:
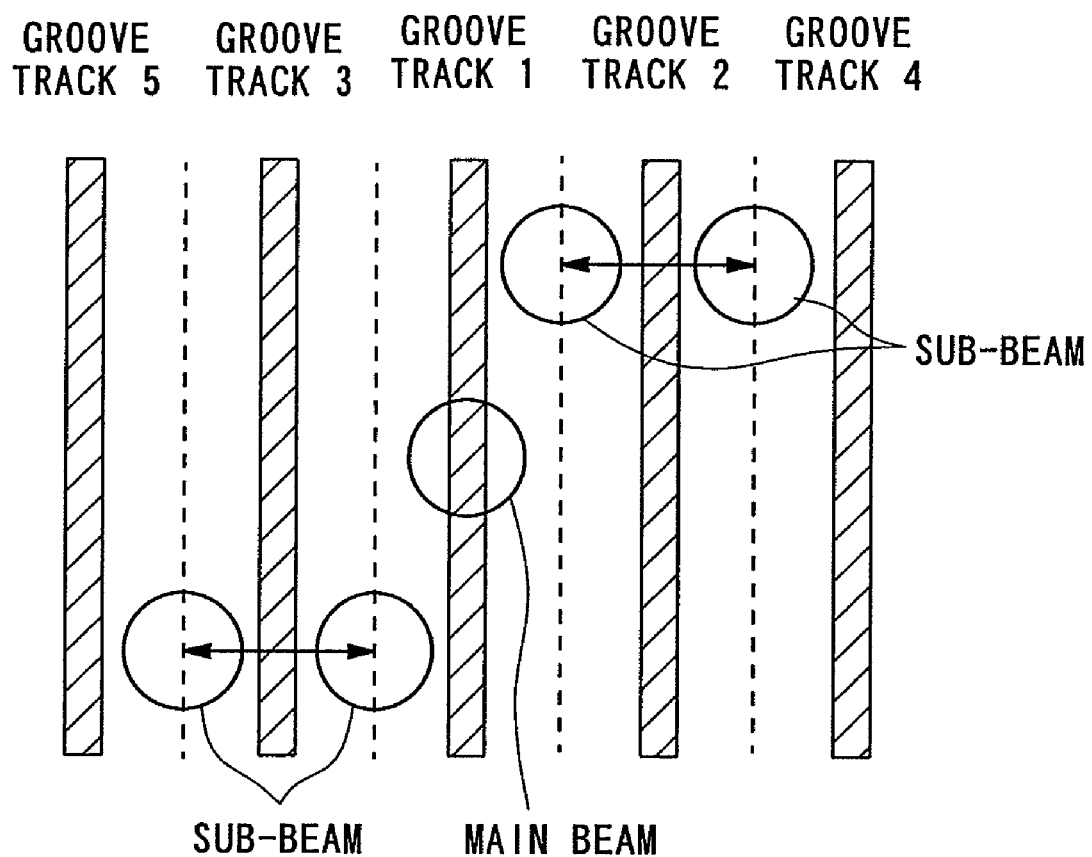
FIG. 15 A diagram showing allowable ranges of the sub-beams when the main beam emitted to the optical disk DK is applied on a track in a second embodiment.

Therefore, it is sufficient that the sub beam resides in the range of FIG. 15.

As described in the second embodiment, Δx(r) becomes the minimum at r=rmax. The condition is expressed as follows.

$$\Delta x(r_{max}) > \frac{TP}{2}$$ [Equation 39]

$$A\Delta x(r_{max}) > \frac{TP}{2}$$ [Equation 40]

It is sufficient to satisfy one of the Equations 39 and 40 within the radius of recording and reproduction. Further, Δx(r) becomes the maximum at r=rmin. The condition is expressed as follows.

$$\Delta x(r_{min}) < \frac{3TP}{2}$$ [Equation 41]

$$A\Delta x(r_{min}) < \frac{3TP}{2}$$

It is sufficient to satisfy one of the equations within the radius of recording and reproduction.

In order to modify the two conditional expressions to the range of the angle γ0, r=rmax is substituted for the Equation 12 as follows.

$$\Delta x(r_{max}) = D\,\sin\!\left(\alpha_0 - \tan^{-1}\!\left(\frac{L}{r_0}\right) + \tan^{-1}\!\left(\frac{L}{r_{max}}\right)\right)$$ [Equation 42]

The range of the angle γ0 is obtained from the range of Δx(rmax) by using the Equations 13 and 14 as follows.

$$\gamma_0 > \sin^{-1}\!\left(\frac{TP}{2D}\right) + \frac{\pi}{2} - \tan^{-1}\!\left(\frac{L}{r_{max}}\right)$$ [Equation 43]

$$\gamma_0 > \sin^{-1}\!\left(\frac{TP}{2AD}\right) + \frac{\pi}{2} - \tan^{-1}\!\left(\frac{L}{r_{max}}\right)$$ [Equation 44]

$$\sin^{-1}\!\left(\frac{TP}{2D}\right) > \sin^{-1}\!\left(\frac{TP}{2AD}\right)$$ [Equation 45]

At this time, the following relation is satisfied.

$$\gamma_0 > \sin^{-1}\left(\frac{TP}{2AD}\right) + \frac{\pi}{2} - \tan-1\left(\frac{L}{r_{max}}\right) \quad \text{[Equation 46]}$$

Therefore, it is sufficient to satisfy the following relation. r=rmin is substituted for the Equation 12 as follows.

$$\Delta x(r_{min}) = D\sin\left(\alpha_0 - \tan^{-1}\left(\frac{L}{r_0}\right) + \tan^{-1}\left(\frac{L}{r_{min}}\right)\right) \quad \text{[Equation 47]}$$

The range of the angle γ0 is obtained from the range of Δx(rmin) by using the Equations 13 and 14 as follows.

$$\gamma_0 < \sin^{-1}\left(\frac{3TP}{2D}\right) + \frac{\pi}{2} - \tan^{-1}\left(\frac{L}{r_{min}}\right) \quad \text{[Equation 48]}$$

$$\gamma_0 < \sin^{-1}\left(\frac{3TP}{2AD}\right) + \frac{\pi}{2} - \tan^{-1}\left(\frac{L}{r_{min}}\right) \quad \text{[Equation 49]}$$

At this time, the following relation is satisfied.

$$\sin^{-1}\left(\frac{3TP}{2D}\right) > \sin^{-1}\left(\frac{3TP}{2AD}\right) \quad \text{[Equation 50]}$$

Therefore, it is sufficient to satisfy the following relation.

$$\gamma_0 < \sin^{-1}\left(\frac{3TP}{2D}\right) + \frac{\pi}{2} - \tan^{-1}\left(\frac{L}{r_{min}}\right) \quad \text{[Equation 51]}$$

$$\sin^{-1}\left(\frac{TP}{2AD}\right) + \frac{\pi}{2} - \tan^{-1}\left(\frac{L}{r_{max}}\right) < \\ \gamma_0 < \sin^{-1}\left(\frac{3TP}{2D}\right) + \frac{\pi}{2} - \tan^{-1}\left(\frac{L}{r_{min}}\right) \quad \text{[Equation 52]}$$

Figure 16:
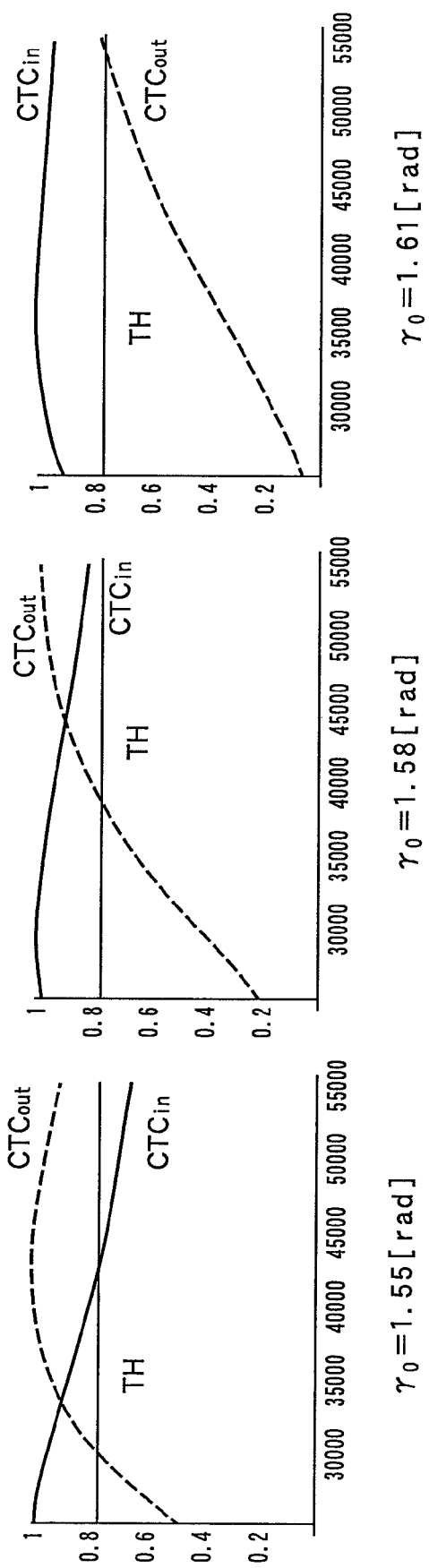
FIG. 16 Graphs showing characteristics of a CTC signal when the angle γ0 lies in the range of Equation 52 in the second embodiment.

FIG. 16 shows examples of the CTC signal in the case where the angle γ0 lies in the range of the Equation 52. Parameters used in calculation are GP=0.74 μm, L=4.0 mm, D=5.0 μm, rmin=2.5 cm, rmax=5.5 cm, and A=2.0. The threshold TH shows the value of the CTC signal when a sub-beam lies in the middle of a track. As shown in the diagram, when γ0 has a value expressed in the Equation 52, at least one of the CTC signals CTCin and CTCout corresponding to the sub-beams "in" has always a value equal to or larger than the threshold TH in the radius of recording and reproduction.

As a result, by assigning weights to the CTC signals CTCin and CTCout by multiplication with the coefficients kin and kout according to the radius positions as follows, proper CTC can be realized.

$$Sctc = Kin \times CTCin - Kout \times CTCout \quad \text{[Equation 53]}$$

As the method of determining the coefficients kin and kout, any method can be employed. For example, in a manner similar to the first embodiment, the coefficients kin and kout to be set in radius positions are determined in advance from the characteristics of the CTC signals CTCin and CTCout obtained after the initial adjustment. The coefficient setting table TBL indicative of the determined coefficient values may be held in advance in the coefficient determining unit CC.

Although each of the CTC signals CTCin and CTCout may be computed as described above, in reality, if two circuits for generating the CTC signals are provided to compute the CTC signals, it causes a rise in the manufacture cost, and practicability is low. Therefore, it is desirable to provide only one circuit for generating the CTC signals and selectively compute larger one of the signals CTCin and CTCout in the circuit. In this case, the magnitudes of signals are written in advance in the coefficient setting table TBL. For example, when the CTC signal CTCin is larger than the CTC signal CTCout (kin=1kout=0) at a certain shift amount "r", only a light reception signal corresponding to the sub-beam "in" is input and computation is performed. Without computing the CTC signal CTCout, a predetermined value is output. By employing the method, one circuit for generating CTC signals becomes sufficient, and rise in the manufacture cost of the apparatus can be prevented.

In the second embodiment, even in the case where the objective lens 171 is disposed in a position shifted in the tangential direction from the slider shaft, proper CTC can be realized.

The invention claimed is:

1. An optical pickup device comprising:
   a light beam emitting device that emits five light beams: (i) a main beam, (ii) a first inner sub-beam, (iii) a second inner sub-beam, (iv) a first outer sub-beam, and (v) a second outer sub-beam;
   a light condensing device that condenses the five light beams at positions on an optical recording medium, shifted by a predetermined amount in the circumferential direction of a wobble recording track from a radius axis passing through a center point of the recording track of the optical recording medium;
   a light receiving device that receives reflection beams of the five light beams from the optical recording medium, and outputs light reception signals corresponding to the beams;
   a generating device that (a) generates an inner signal for use in at least any one of tracking correction and crosstalk cancellation from the light reception signals corresponding to the main beam, the first inner sub-beam, and the second inner sub-beam, and (b) generates an outer signal for use in at least one of tracking correction and crosstalk cancellation from the light reception signals corresponding to the main beam, the first outer sub-beam, and the second outer sub-beam; and
   a sum signal generating device that multiplies each of the inner and outer signals with a coefficient and thereafter generates a sum signal of the inner and outer signals multiplied with the coefficients.

2. The optical pickup device according to claim 1, wherein the light beam emitting device that emits five light beams includes a light source and a diffracting device.

3. The optical pickup device according to claim 1, further comprising:
   a distance calculating device that calculates a distance from (a) an intersection of a line, passing through a light condensing position of the main beam and being perpendicular to the radius axis, and the radius axis to (b) a center point of the recording track,
   wherein the sum signal generating device determines a coefficient to be multiplied with the inner and outer signals on the basis of the distance thus calculated.

4. The optical pickup device according to claim 3,
wherein the sum signal generating device determines a coefficient to be multiplied with the inner and outer signals on the basis of values of the inner and outer signals and the distance.

5. The optical pickup device according to claim 1,
wherein the optical beam emitting device emits the five light beams so that, when the inner and outer signals are obtained as a periodic function, an angle formed between the radius axis and a straight line, formed by connecting the light condensing spots of the beams emitted to the optical recording medium satisfies three conditions:

(a) condition 1: an in-phase intersection does not exist between the inner and outer signals, (b) condition 2: a signal value at an opposite-phase intersection of the inner signal and the outer signal is equal to or larger than a predetermined threshold, and (c) condition 3: any one of the inner and outer signals becomes equal to or larger than the threshold at any one of the innermost and outermost radiuses of record and reproduction in the optical recording medium.

6. The optical pickup device according to claim 1, further comprising:
   a correcting device that executes at least any one of tracking correction and crosstalk cancellation on the basis of the sum signal thus generated.

7. The optical pickup device according to claim 1, wherein the condensing device has a plurality of objective lenses.

8. An information recording/reproducing apparatus comprising:
   the optical pickup device according to claim 1;
   a driving device that drives the optical pickup device;
   a control device that controls record/reproduction of information with respect to the optical recording medium by controlling the driving device; and
   an output device that outputs a signal corresponding to a light reception result in the optical pickup device.

9. A controlling method of an optical pickup device comprising:
   a light beam emitting device that emits five light beams: (i) a main beam, (ii) a first inner sub-beam, (iii) a second inner sub-beam, (iv) a first outer sub-beam, and (v) a second outer sub-beam;
   a light condensing device that condenses the five light beams at positions on an optical recording medium, shifted by a predetermined amount in the circumferential direction of a wobble recording track from a radius axis passing through a center point of the recording track of the optical recording medium; and
   a light receiving device that receives reflection beams from the optical recording medium of the five light beams and outputs light reception signals corresponding to the beams, the method comprising:
   a generating step of (a) generating an inner signal for use in at least any one of tracking correction and crosstalk cancellation from the light reception signals corresponding to the main beam, the first inner sub-beam, and the second inner sub-beam, and (b) generating an outer signal for use in at least one of tracking correction and crosstalk cancellation from the light reception signals corresponding to the main beam, the first outer sub-beam, and the second outer sub-beam; and
   a sum signal generating step of multiplying each of the inner and outer signals with a coefficient and thereafter generating a sum signal of the inner and outer signals multiplied with the coefficients.

* * * * *